(12) United States Patent
Ichise et al.

(10) Patent No.: US 7,249,454 B2
(45) Date of Patent: *Jul. 31, 2007

(54) FUEL INJECTION CONTROL APPARATUS AND FUEL INJECTION CONTROL METHOD FOR INTERNAL COMBUSTION ENGINE

(75) Inventors: Masaharu Ichise, Susono (JP); Toshimi Kashiwagura, Susono (JP); Shinichiro Nogawa, Susono (JP); Koichi Yonezawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/985,986

(22) Filed: Nov. 12, 2004

(65) Prior Publication Data

US 2005/0120709 A1     Jun. 9, 2005

(30) Foreign Application Priority Data

Nov. 12, 2003  (JP)  ............................. 2003-382828
Dec. 9, 2003   (JP)  ............................. 2003-410738

(51) Int. Cl.
*F01N 3/00* (2006.01)

(52) U.S. Cl. ........................... 60/285; 60/274; 60/284; 60/286; 123/295; 123/299; 123/431

(58) Field of Classification Search ................ 60/284, 60/285, 286, 274; 123/295, 299, 300, 305, 123/431, 430

See application file for complete search history.

(56) References Cited

U.S. PATENT DOCUMENTS 5,642,705 A  *  7/1997  Morikawa et al. .......... 123/300
6,044,642 A  *  4/2000  Nishimura et al. ........... 60/285
6,119,453 A     9/2000  Motose et al.
6,340,014 B1 *  1/2002  Tomita et al. ............... 123/295
6,543,412 B2 *  4/2003  Amou et al. ................. 123/337
6,557,521 B2 *  5/2003  Ichihara et al. ............. 123/299
6,718,960 B2 *  4/2004  Someno et al. ............. 123/704

FOREIGN PATENT DOCUMENTS

| EP | 0 849 455 A | 6/1998 |
|---|---|---|
| JP | 59-188021 | 10/1984 |

(Continued)

*Primary Examiner*—Binh Q. Tran
(74) *Attorney, Agent, or Firm*—Kenyon & Kenyon LLP

(57) ABSTRACT

An internal combustion engine includes an in-cylinder injection valve and an intake passage injection valve. A control apparatus of the engine determines whether a catalyst located in an exhaust passage is in an overtemperature condition. When the catalyst is determined to be in the overtemperature condition, the control apparatus controls the injection valves to increase the amount fuel supplied to the cylinder compared to a case where the catalyst is determined not to be in the overtemperature condition. The control apparatus sets a mode for causing the injection valves to increase the amount of supplied fuel according to an operational state of the engine. For example, in a case where the component is determined to be in the overtemperature condition when the engine is operating in a fuel injection mode in which fuel is injected at least from the in-cylinder injection valve, at least the intake passage injection valve performs fuel injection for increasing the supplied fuel. Therefore, the catalyst is reliably prevented from being overheated.

22 Claims, 16 Drawing Sheets

FOREIGN PATENT DOCUMENTS

| | | |
|---|---|---|
| JP | 05-231221 | 9/1993 |
| JP | 07-103050 | 4/1995 |
| JP | 11-351041 | 12/1999 |
| JP | 2001-20837 | 1/2001 |
| JP | 2001-050081 A | 2/2001 |
| JP | 2001-336439 A | 12/2001 |
| JP | 2002-130011 | 5/2002 |
| JP | 2003-065111 A | 3/2003 |
| JP | 02005351116 A * 12/2005 | .................. 60/285 |

* cited by examiner

FUEL INJECTION CONTROL APPARATUS AND FUEL INJECTION CONTROL METHOD FOR INTERNAL COMBUSTION ENGINE

BACKGROUND OF THE INVENTION

The present invention relates to an apparatus and a method for controlling fuel injection in an internal combustion engine that includes an injection valve for injecting fuel into a cylinder and an injection valve for injecting fuel into an intake passage. Particularly, the present invention relates to a technique for preventing a component provided in an exhaust passage, such as catalyst for purifying exhaust gas, from being overheated.

Japanese Laid-Open Patent Publications No. 5-231221, No 7-103050, and No. 2001-20837 each disclose an internal combustion engine having an injection valve for directly injecting fuel into a cylinder (in-cylinder injection valve) and an injection valve for injecting fuel into an intake passage (intake cylinder injection valve). In such an internal combustion engine, various fuel injection modes can be performed using the two types of injection valves, thereby permitting the engine to be finely controlled according to the engine operational state. For example, when the intake passage injection valve is used for injecting fuel, homogeneous air-fuel mixture is formed in the cylinder and such mixture is combusted (homogeneous combustion).

On the other hand, when the in-cylinder injection valve is used for injecting fuel, the engine is operated in a combustion mode selected from a stratified combustion mode and a homogeneous combustion mode. In the stratified combustion mode, fuel is injected from the in-cylinder injection valve during the compression stroke of the engine so that relatively rich air-fuel mixture is formed in the vicinity of the ignition plug. In this state, the mixture is ignited to perform combustion. The stratified combustion mode permits the engine to operate by the combustion a relatively lean air-fuel mixture. Accordingly, the fuel economy is improved and the emission of $CO_2$ is reduced.

In the homogenous combustion mode, fuel is injected from the in-cylinder injection valve during the intake stroke of the engine so that homogenous air-fuel mixture is formed in the cylinder. In this state, the mixture is ignited to perform combustion. Air that is drawn into the cylinder is cooled by the effect of heat of evaporation of injected fuel. Accordingly, the filling efficiency of air to the cylinder is increased. Therefore, when the engine is operated in the homogeneous combustion mode, the engine produces greater power.

Also, a fuel injection mode in which fuel is injected from both of the in-cylinder injection valve and the intake passage injection valve can be performed.

A catalyst for purifying exhaust gas is provided in the exhaust system of an engine. If the catalyst is overheated due to a temperature increase of exhaust gas, the purifying performance of the catalyst can be degraded, and the life of the catalyst can be shortened. Japanese Laid-Open Patent Publication No. 2002-130011 discloses a technique in which the amount of fuel supplied to a cylinder is increased to prevent a catalyst from being overheated. However, the technique disclosed in the publication is only applicable to engines having an in-cylinder injection valve, but cannot be favorably applied to engines having an in-cylinder injection valve and an intake passage injection valve.

Japanese Laid-Open Patent Publication No. 7-103050 discloses a technique for switching injection valves. Specifically, when an abnormality in fuel injection from an in-cylinder injection valve is detected, fuel injection from the in-cylinder injection valve is stopped and fuel injection from an intake passage injection valve is started. An abnormality of fuel injection degrades the combustion state and affects the temperature of exhaust gas, in other words, affects the temperature of a catalyst. However, Japanese Laid-Open Patent Publication No. 7-103050 only discloses that the injection valve to inject fuel is switched to the intake passage injection valve when an abnormality is detected in fuel injection from the in-cylinder injection valve. In the publication, overtemperature of the catalyst is not taken into consideration at all.

SUMMARY OF THE INVENTION

Accordingly, it is an objective of the present invention to provide a fuel injection control apparatus and a fuel injection control method that readily prevent a component provided in an exhaust passage from being overheated in an internal combustion engine that includes an injection valve for injecting fuel into the cylinder and an injection valve for injecting fuel into the intake passage.

To achieve the foregoing and other objectives and in accordance with the purpose of the present invention, a fuel injection control apparatus for an internal combustion engine is provided. The engine has an in-cylinder injection valve for injecting fuel into a cylinder of the engine, an intake passage injection valve for injecting fuel into an intake passage connected to the cylinder, and an exhaust passage connected to the cylinder. The apparatus includes a temperature determining section and an injection control section. The temperature determining section determines whether a component located in the exhaust passage is in an overtemperature condition. The injection control section controls the in-cylinder injection valve and the intake passage injection valve. When the component is determined to be in the overtemperature state, the injection control section controls the injection valves to increase the amount of fuel supplied to the cylinder compared to a case where the component is determined not to be in the overtemperature state. The injection control section sets a mode for causing the injection valves to increase the amount of supplied fuel according to an operational state of the engine.

The present invention also provides a fuel injection control apparatus for an internal combustion engine. The engine has an in-cylinder injection valve for injecting fuel into a cylinder of the engine, an intake passage injection valve for injecting fuel into an intake passage connected to the cylinder, and an exhaust passage connected to the cylinder. The apparatus includes a temperature determining section and an injection control section. The temperature determining section determines whether the temperature of a component located in the exhaust passage is higher than or equal to a predetermined reference value based on a parameter related to the temperature of the component. When the temperature of the component is higher than or equal to the reference value, the injection control section increases a fuel injection amount of the intake passage injection valve compared to a case where the temperature of the component is not higher than or equal to the reference value.

Further, present invention provides a fuel injection control method for an internal combustion engine. The engine has an in-cylinder injection valve for injecting fuel into a cylinder of the engine, an intake passage injection valve for injecting fuel into an intake passage connected to the cylinder, and an exhaust passage connected to the cylinder. The method includes: determining whether a component located in the exhaust passage is in an overtemperature condition;

controlling the in-cylinder injection valve and the intake passage injection valve to increase the amount of fuel supplied to the cylinder compared to a case where the component is determined not to be in the overtemperature state, when the component is determined to be in the overtemperature state; and setting a mode for causing the injection valves to increase the amount of supplied fuel according to an operational state of the engine.

The present invention provides another fuel injection control method for an internal combustion engine. The engine has an in-cylinder injection valve for injecting fuel into a cylinder of the engine, an intake passage injection valve for injecting fuel into an intake passage connected to the cylinder, and an exhaust passage connected to the cylinder. The method includes: determining whether the temperature of a component located in the exhaust passage is higher than or equal to a predetermined reference value based on a parameter related to the temperature of the component; and increasing a fuel injection amount of the intake passage injection valve compared to a case where the temperature of the component is not higher than or equal to the reference value, when the temperature of the component is higher than or equal to the reference value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to the drawings.

Figure 1:
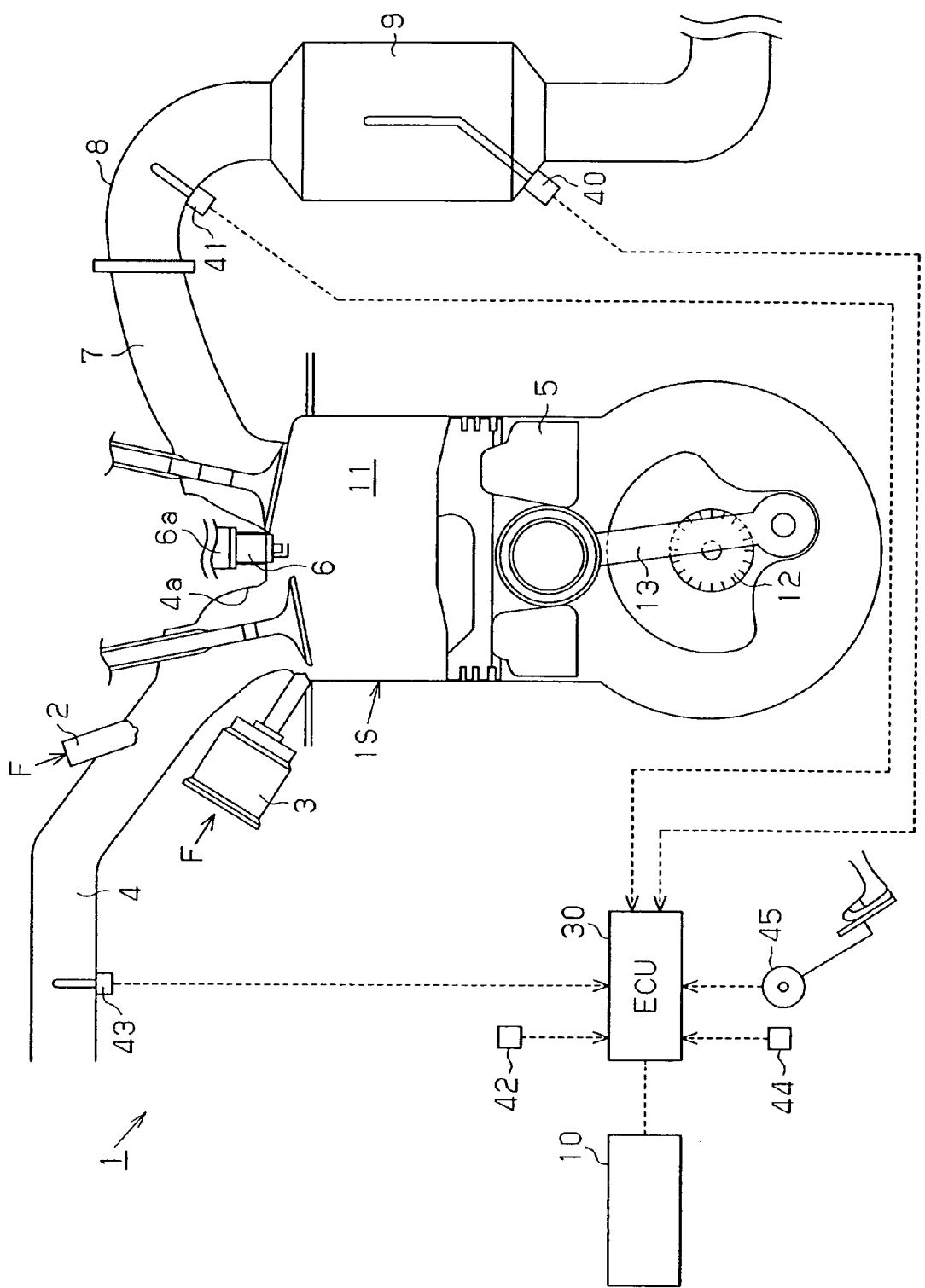
FIG. 1 is a schematic diagram illustrating an internal combustion engine and its control apparatus according to a first embodiment of the present invention.

As shown in FIG. 1, an internal combustion engine 1 of the present embodiment is a reciprocating internal combustion engine that uses gasoline as fuel. The engine 1 is particularly applicable to vehicles such as passenger vehicles, buses, and trucks. The engine 1 is controlled by a control apparatus 10 and an electronic control unit (ECU) 30, which is separate from the control apparatus 10. The control apparatus 10 and the ECU 30 operate in association with each other to control the engine 1. The engine 1 has a cylinder 1S in which a combustion chamber 11 is defined, an intake passage 4 connected to the combustion chamber 11, and an exhaust passage 7 connected to the combustion chamber 11. A part of the exhaust passage 7 is formed by an exhaust manifold 8. A three-way catalyst 9 is located in the exhaust manifold 8. A piston 5 provided in the cylinder 1S is connected via a connecting rod 13 to a crankshaft 12, which is the output shaft for the engine 1. The connecting rod 13 converts reciprocation of the piston 5 into rotation of the crankshaft 12.

The engine 1 also has a first injection valve and a second injection valve. In this embodiment, the first injection valve is an in-cylinder injection valve 3 that injects fuel F into the cylinder 1S, or into the combustion chamber 11, and the second injection valve is an intake passage injection valve 2 that injects fuel F into the intake passage 4. The joint between the combustion chamber 11 and the intake passage 4 form an intake port 4a. The intake passage injection valve 2 injects fuel F toward the intake port 4a. Accordingly, the intake passage injection valve 2 will hereinafter be referred to as port injection valve. The port injection valve 2 and the in-cylinder injection valve 3 receive fuel having a predetermined pressure through a fuel supply mechanism (not shown). The pressure of fuel supplied to the in-cylinder injection valve 3 is higher than the pressure of fuel supplied to the port injection valve 2. Fuel F is supplied to the cylinder 1S by at least one of the port injection valve 2 and the in-cylinder injection valve 3.

Air that is guided to the cylinder 1S through the intake passage 4 forms air-fuel mixture with fuel injected from the port injection valve 2 or the in-cylinder injection valve 3. The air-fuel mixture is ignited by an ignition plug 6 in the cylinder 1S to be combusted, and then becomes combustion gas. The timing for igniting the air-fuel mixture by the ignition plug 6 is adjusted by an igniter 6a provided in an upper portion of the ignition plug 6. The combustion pressure of the combustion gas is transmitted to the piston 5, thereby reciprocating the piston 5. After driving the piston 5, the combustion gas is guided to the three-way catalyst 9 through the exhaust passage 7. The three-way catalyst 9 reduces CO, HC, and NOx components in the combustion gas to purify the combustion gas.

In the present embodiment, various fuel injection modes can be performed using two types of injection valves, namely the port injection valve 2 and the in-cylinder injection valve 3. For example, when only the port injection valve 2 is used for injecting fuel, homogeneous air-fuel mixture is formed in the cylinder 1S and such mixture is combusted (homogeneous combustion). The fuel injection mode using the port injection valve 2 is performed, for example, when the engine 1 is operating under relatively low load. On the other hand, when only the in-cylinder injection valve 3 is used for injecting fuel, the engine 1 is operated in a combustion mode selected from a stratified combustion mode and a homogeneous combustion mode. In the stratified combustion mode, fuel is injected from the in-cylinder injection valve 3 during the compression stroke of the engine 1 so that relatively rich air-fuel mixture is formed in the vicinity of the ignition plug 6. In this state, the mixture is ignited to perform combustion. The stratified combustion mode is performed, for example, when the engine 1 is operating under relatively low load. In the homogenous combustion mode, fuel is injected from the in-cylinder injection valve 3 during the intake stroke of the engine 1 so that homogenous air-fuel mixture is formed in the cylinder 1S. In this state, the mixture is ignited to perform combustion. The homogenous combustion mode is performed, for example, when the engine 1 is operating under relatively high load. Also, a fuel injection mode in which fuel is injected from both of the in-cylinder injection valve 3 and the port injection valve 2 can be performed. A fuel injection mode to be performed may be selected as necessary according to the operational state of the engine 1, such as the engine load KL and the engine rotational speed NE.

Means for detecting a parameter related to the catalyst temperature (the catalyst bed temperature) is attached to the three-way catalyst 9. In this embodiment, a temperature sensor 40 that detects the temperature Tc of the catalyst bed (hereinafter, referred to as catalyst temperature Tc) is attached to the three-way catalyst 9. The detected catalyst temperature Tc is used for determining an overtemperature (OT) of the three-way catalyst 9 and for executing control for suppressing the OT of the three-way catalyst 9. An air-fuel ratio sensor (hereinafter, referred to as A/F sensor) 41 is provided in the exhaust manifold 8 to detect the air-fuel ratio A/F of air-fuel mixture formed in the cylinder 1S. The detected air-fuel ratio A/F is used for, for example, detecting an abnormality of combustion in the engine 1. For example, the output of the A/F sensor 41 is compared with a target air-fuel ratio determined according to the operational state of the engine 1 to determine whether there is a combustion abnormality in the engine 1. In this embodiment, the output of the temperature sensor 40 and the output of the A/F sensor 41 are sent to the control apparatus 10 via the ECU 30. However, the output may be sent directly to the control apparatus 10.

In addition to the catalyst bed temperature, parameters related to the catalyst temperature include, for example, the temperature of exhaust gas. The exhaust gas temperature may be directly detected by a sensor or may be estimated from a parameter other than the exhaust gas temperature. Alternatively, a map defining the relationship of the catalyst temperature Tc to the engine operational state such as an engine load KL, an engine rotational speed NE, the air-fuel ration A/F, and an intake air flow rate GA may be prepared, and the catalyst temperature Tc that corresponds to the current engine operational state may be obtained by referring to the map. Alternatively, a map may be prepared defining the relationship between the intake air flow rate GA and the amount of change of exhaust gas temperature per unit time, and, by referring to the map, exhaust gas temperature that corresponds to the current engine operational state may be estimated. In this case, the catalyst temperature Tc is estimated based on the estimated exhaust gas temperature. That is, even if the catalyst temperature Tc is not directly detected, any parameter that permits the catalyst temperature Tc to be estimated may be used as a parameter related to the catalyst temperature Tc.

Figure 2:
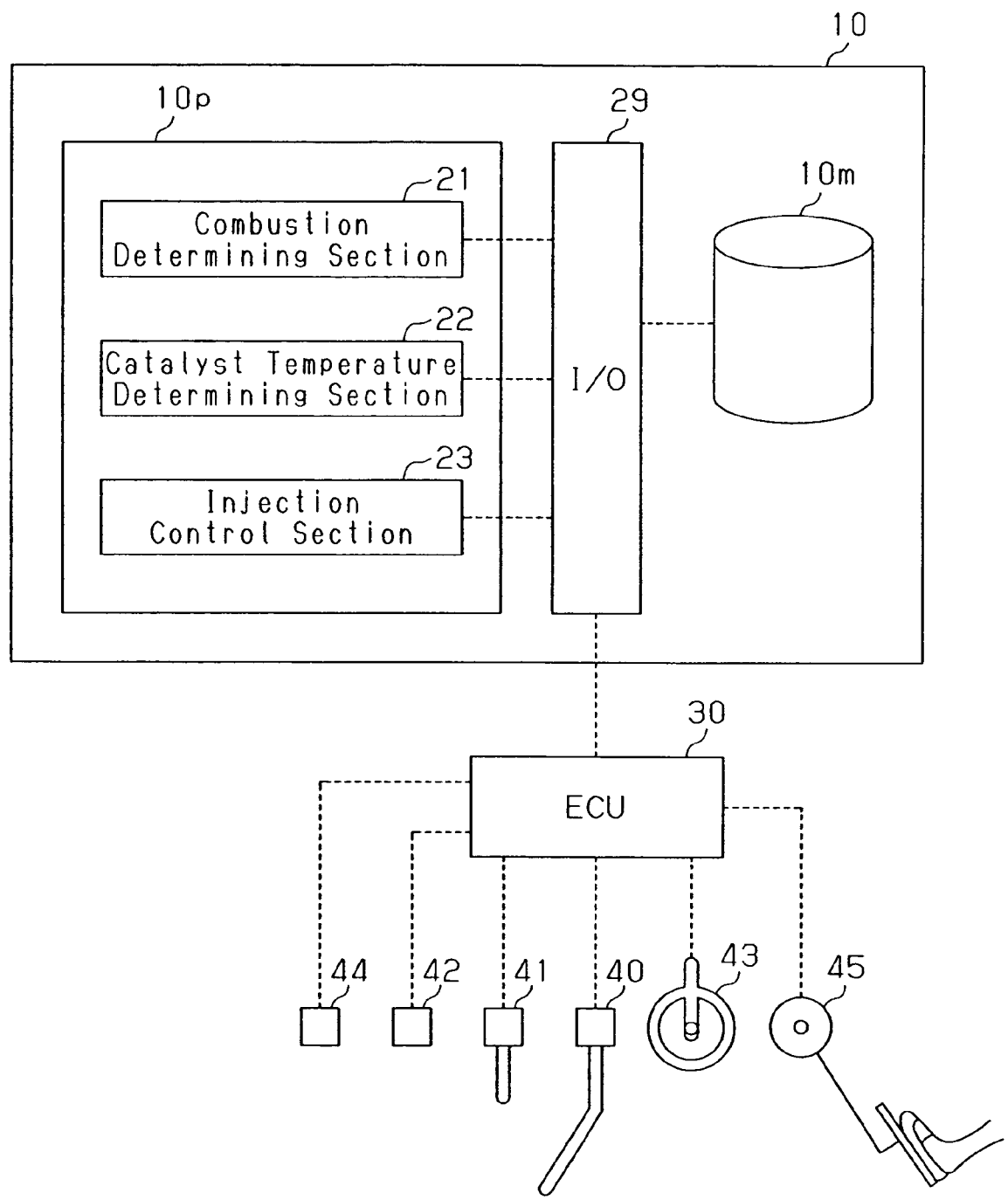
FIG. 2 is a block circuit diagram of the control apparatus shown in FIG. 1.

As shown in FIG. 2, the control apparatus 10 includes a processing section 10p and a memory section 10m. The processing section 10p includes a combustion determining section 21, a catalyst temperature determining section 22, and an injection control section 23. The memory section 10m, the combustion determining section 21, the catalyst temperature determining section 22, and the injection control section 23 are connected to each other with an input-output interface (I/O) 29 and perform two-way data transmission. As necessary, one-way data transmission may be performed.

The control apparatus 10 and the ECU 30 are connected to each other with the input-output interface 29 and performs two-way data transmission. The control apparatus 10 obtains via the ECU 30 various information necessary for controlling the engine 1, for example, information representing the engine operational state such as the load KL of the engine 1 and the rotational speed NE of the engine 1, and information obtained with various sensors. The control apparatus 10 is also capable of causing the engine control executed by itself to interrupt an engine control routine executed by the ECU 30. The control apparatus 10 may be configured by some functions of the ECU 30 when it controls the engine 1 or may be incorporated in the ECU 30.

The memory section 10m stores various programs and various data necessary for controlling the engine 1. The memory section 10m may be a volatile memory such as random access memory (RAM), a nonvolatile memory such as a flash memory, or a combination of these. The processing section 10p may composed of a computer that includes memory and a CPU. In this case, the combustion determining section 21, the catalyst temperature determining section 22, and the injection control section 23 of the processing section 10p correspond to functions performed by the computer according to control programs stored in the memory section 10m.

Alternatively, instead of performing the control programs, the control section 10p may use a dedicated hardware to perform the functions of the combustion determining section 21, the catalyst temperature determining section 22, and the injection control section 23.

A throttle sensor 42 detects the opening degree of a throttle valve located in the intake passage 4. An airflow sensor 43 detects an intake air flow rate GA in the intake passage 4. A crank sensor 44 detects the rotational phase (crank angle) of the crankshaft 12 and the engine rotational speed NE. A pedal depression degree sensor 45 detects the depression degree of an acceleration pedal. The ECU 30 obtains the output of various sensors including these sensors 42, 43, 44, 45, thereby controlling the operation of the engine 1.

Figure 3:
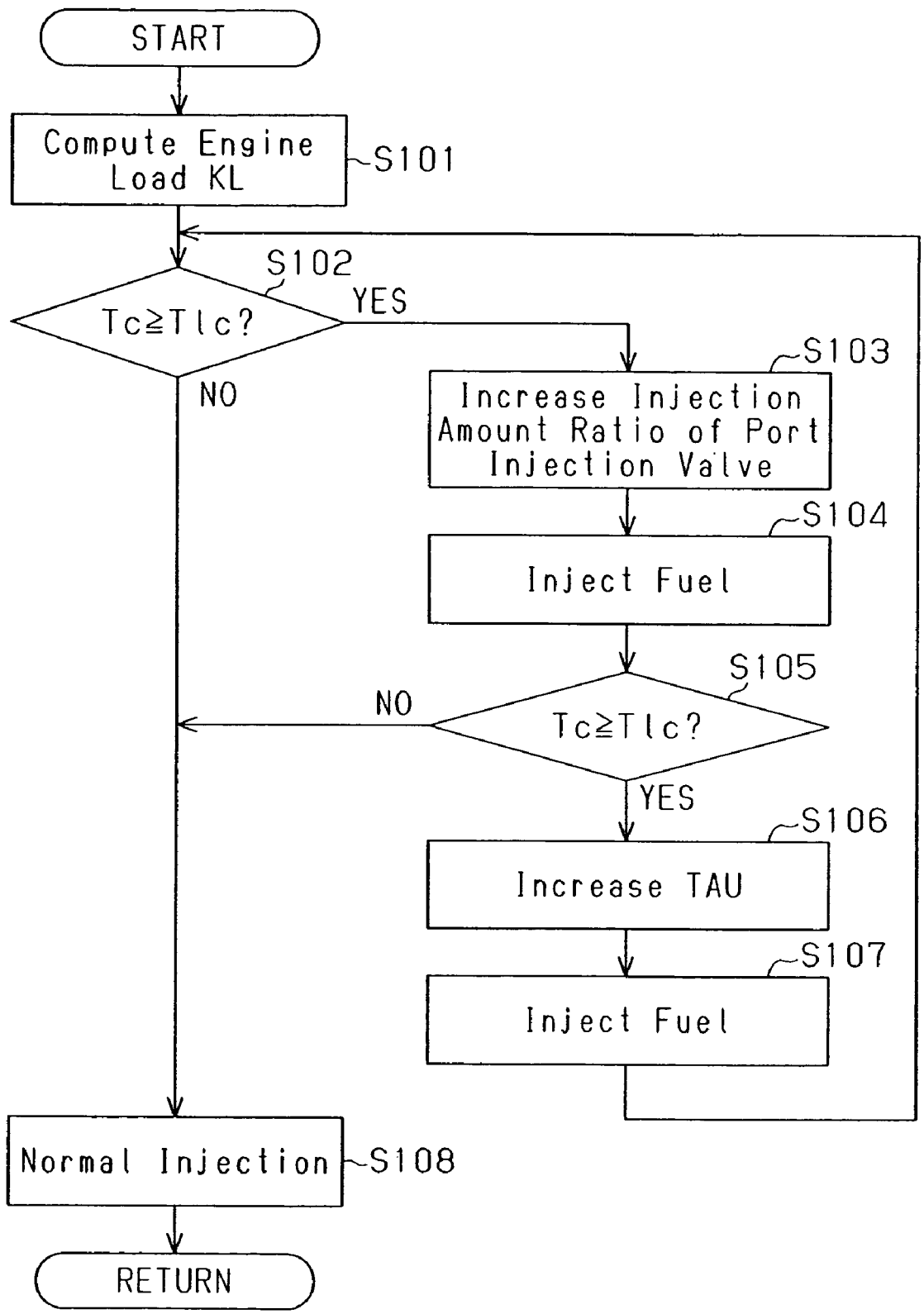
FIG. 3 is a flowchart showing a procedure for controlling fuel injection according to the first embodiment.

FIG. 3 is a flowchart showing a procedure for controlling fuel injection executed by the control apparatus 10 and the ECU 30. When performing the procedure, it is assumed that the engine 1 is operating using at least the in-cylinder injection valve 3.

At step S101, the ECU 30 obtains information such as the engine rotational speed NE and the intake air flow rate GA, thereby computing the engine load KL and other values. Based on the engine load KL, the engine rotational speed NE and other values, the ECU 30 or the injection control section 23 computes a total fuel injection amount TAU, which is the total amount fuel supplied to the cylinder 1S.

Next, at step S102, the catalyst temperature determining section 22 compares the catalyst temperature Tc with a predetermined reference value, and determines whether the catalyst temperature Tc is higher than or equal to the reference temperature. The reference value is used for determining whether the three-way catalyst 9 is in an overtemperature condition or in a condition close to the overtemperature condition, and may be an upper temperature limit Tl of the three-way catalyst 9 or a corrected upper temperature limit Tlc (Tlc=Tl–δT), which is a value obtained by subtracting a safety temperature margin δT from the upper temperature limit Tl. In this embodiment, the corrected upper temperature limit Tlc is used as the reference value.

Figure 4:
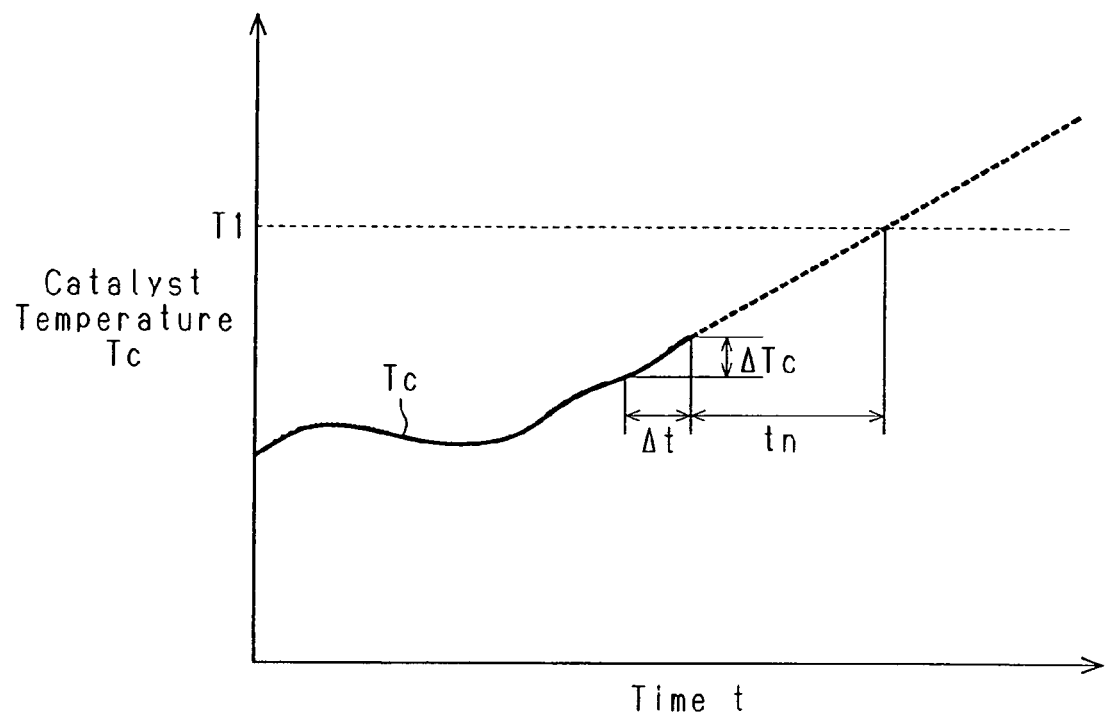
FIG. 4 is a graph showing changes of catalyst temperature over time.

Also, instead of comparing the catalyst temperature Tc with a reference value, time tn that is required for the catalyst temperature Tc to surpass the reference value may be estimated based on the increase rate of the catalyst temperature Tc, and the time tn may be compared with a predetermined reference time. FIG. 4 is a graph showing changes of the catalyst temperature Tc over time. For example, the catalyst temperature determining section 22 may compute an increase rate $\Delta Tc/\Delta t$ of the catalyst temperature Tc, and estimates time tn required for the current catalyst temperature Tc to surpass a predetermined reference value (the upper temperature limit Tl in this case) based on the current catalyst temperature Tc and the increase rate $\Delta Tc/\Delta t$. When the catalyst temperature determining section 22 determines that the estimated time tn is less than or equal to a predetermined time, the procedure proceeds to step S103.

At step S102, if the catalyst temperature Tc is lower than the corrected upper temperature limit Tlc, it is determined that the catalyst temperature Tc is normal and that there is no abnormal temperature increase in the three-way catalyst 9. Thus, normal fuel injection is performed at step S108. That is, fuel is injected without changing the total fuel injection amount TAU and without changing the ratio between the fuel injection amount from the port injection valve 2 and the fuel injection amount from the in-cylinder injection valve 3.

On the other hand, if the catalyst temperature Tc is higher than or equal to the corrected upper temperature limit Tic at step S102, it is determined that the catalyst temperature Tc has substantially reached the upper temperature limit Tl of the three-way catalyst 9. One of the causes of increase in the catalyst temperature Tc is a high load operation of the engine 1 over an extended period of time. A malfunction of the in-cylinder injection valve 3 and deposit collected on the in-cylinder injection valve 3 can cause poor formation of fuel spray. This in tern increases the air-fuel ratio A/F, or forms lean air-fuel mixture. In such a case, the catalyst temperature Tc is likely to increase. If the engine 1 continues operating with the catalyst temperature Tc being higher than or equal to the corrected upper temperature limit Tlc, an overtemperature condition of the three-way catalyst 9 can degrade the exhaust gas purifying performance or the durability of the three-way catalyst 9.

Figure 6:
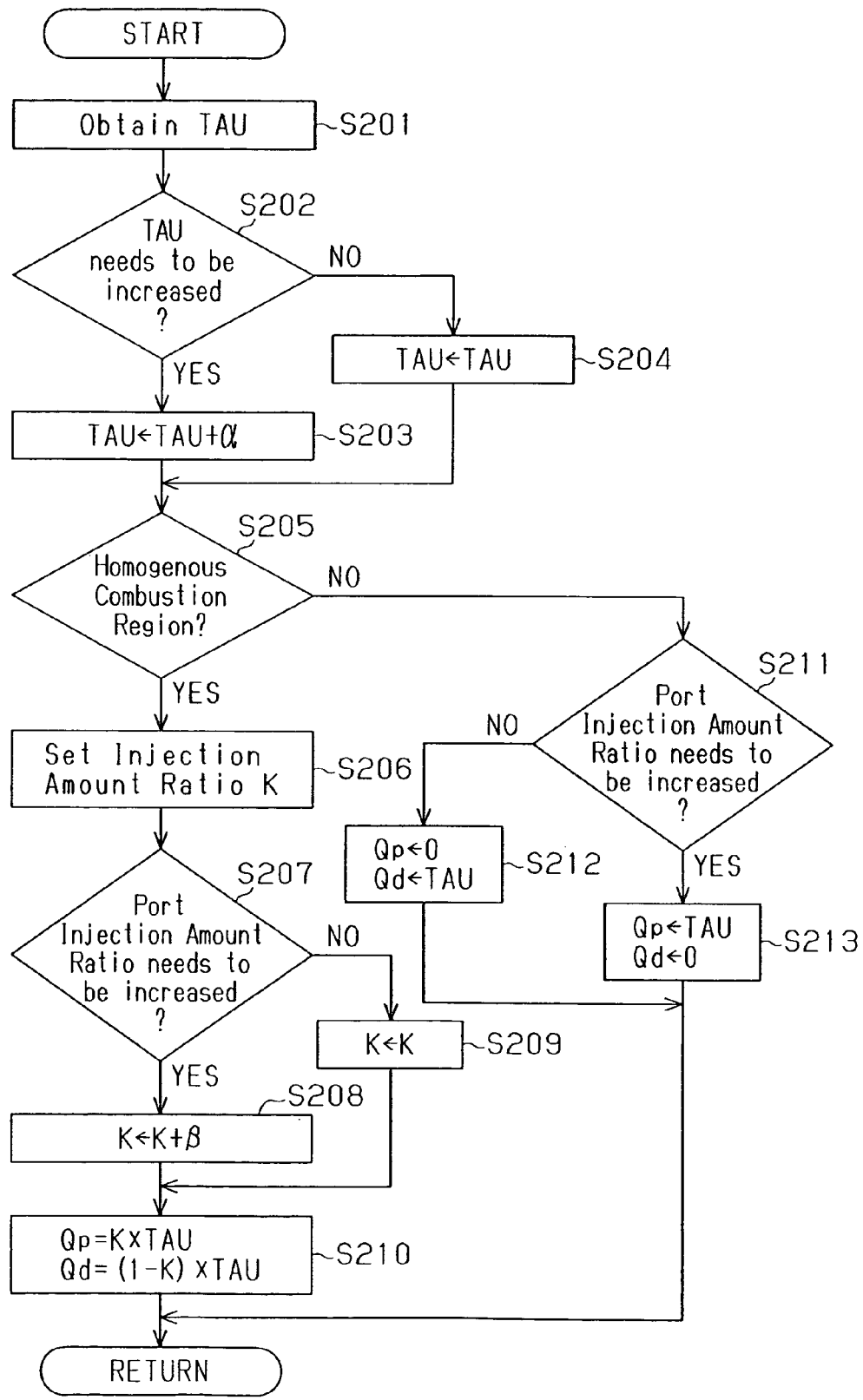
FIG. 6 is a flowchart showing a procedure for setting an injection amount ratio.

When the outcome of step S102 is positive, the injection control section 23 executes control for lowering the catalyst temperature Tc. Specifically, at step S103, the injection control section 23 increases the ratio of the fuel injection amount from the port injection valve 2 without changing the total fuel injection amount TAU, which is the total amount of fuel to be supplied to the cylinder 1S, thereby reducing the ratio of the fuel injection amount from the in-cylinder injection valve 3. The ratio between the fuel injection amounts of the injection valves 2, 3 is determined according to the procedure of the flowchart shown in FIG. 6, which will be discussed below. At step S104, the port injection valve 2 and the in-cylinder injection valve 3 are controlled to inject fuel at the determined injection amount ratio.

At step S105, the catalyst temperature determining section 22 determines whether the catalyst temperature Tc is higher than or equal to the corrected upper temperature limit Tlc. When the catalyst temperature Tc falls below the corrected upper temperature limit Tlc, the procedure proceeds to step S108, at which the normal injection is performed.

Figure 5:
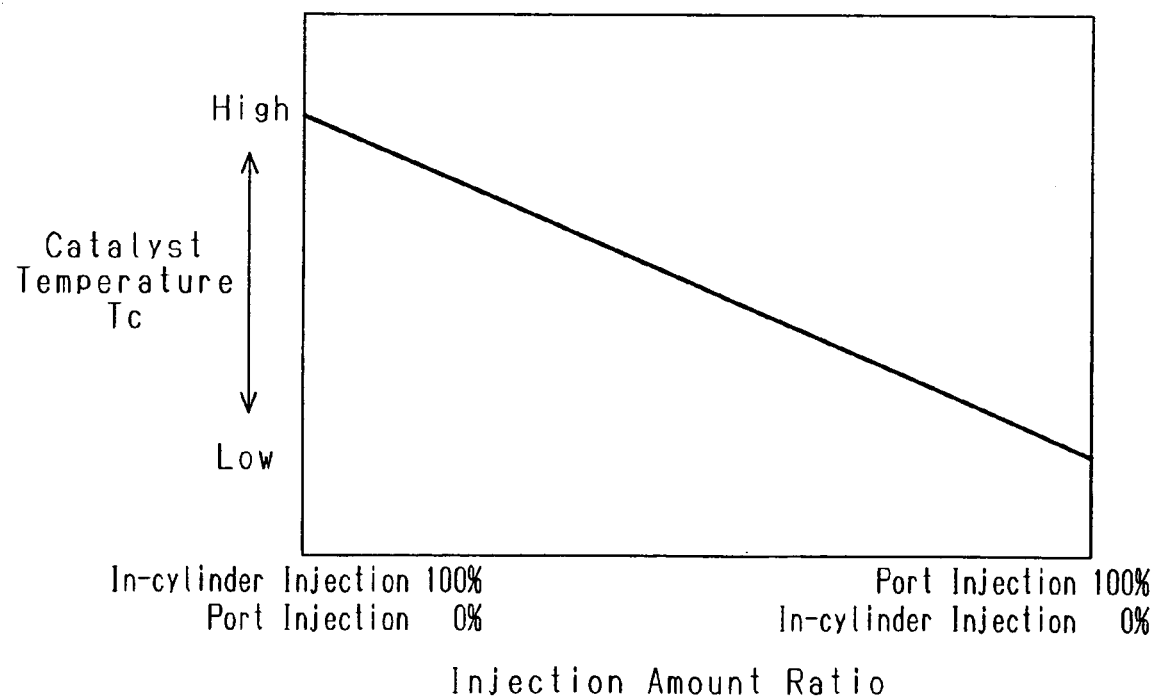
FIG. 5 is a graph showing the relationship of the catalyst temperature to the amount of fuel injected from the in-cylinder injection valve and the amount of fuel injected from the port injection valve.

FIG. 5 is a graph showing the relationship of the catalyst temperature Tc to the fuel injection amount ratio between the in-cylinder injection valve 3 and the port injection valve 2. As shown in FIG. 5, the catalyst temperature Tc is lowered as the fuel injection amount ratio of the port injection valve 2 is increased. That is, the port injection promotes mixing of fuel with air more than the in-cylinder injection, and thus promotes vaporization of fuel. As the fuel vaporization is promoted, the amount of HC and CO in exhaust gas is reduced. This suppresses the generation of heat due to the reaction of the catalyst 9 to HC and CO. As a result, the catalyst temperature Tc is lowered. Therefore, as long as the total fuel injection amount TAU is constant, the catalyst temperature Tc is effectively lowered by increasing the fuel injection amount ratio of the port injection valve 2 to lower the fuel injection amount ratio of the in-cylinder injection valve 3. Further, since the catalyst temperature Tc is lowered without increasing the total fuel injection amount TAU, the fuel economy is not degraded.

If the air-fuel ratio A/F is increased due to insufficient formation of fuel spray from the in-cylinder injection valve 3, and the catalyst temperature Tc is increased, accordingly, the fuel injection amount ratio of the port injection valve 2 is increased so that the catalyst temperature Tc is effectively lowered. Also, since the increased air fuel ratio A/F is caused to seek the target air-fuel ratio by increasing the fuel injection amount ratio of the port injection valve 2, the concentration of HC and CO in exhaust gas is prevented from increasing.

On the other hand, when the outcome of step S105 is positive, that is, when the catalyst temperature Tc stays equal to or above the corrected upper temperature limit Tlc even after the fuel injection amount ratio of the port injection valve 2 is increased, the injection control section 23 increases the total fuel injection amount TAU at step S106. At step S107, the port injection valve 2 and the in-cylinder injection valve 3 are controlled to inject fuel the amount of which corresponds to the increased total fuel injection amount TAU. As the total fuel injection amount TAU is increased, the air-fuel ratio A/F is lowered and the mixture is richened. This improves the combustion state and thus decreases the amount of unburned HC in exhaust gas. As a result, the exhaust gas temperature is lowered, and the catalyst temperature Tc is lowered.

When increasing the total fuel injection amount TAU, the increase rate of the fuel injection amount from the port injection amount 2 may be made greater than that of the in-cylinder injection valve 3. Alternatively, the increase of the total fuel injection amount TAU may be entirely achieved by increase of the fuel injection amount of the port injection valve 2. Alternatively, the fuel injection amount from the in-cylinder injection valve 3 may be decreased to zero, and the whole increasing amount of the total fuel injection amount TAU may be injected only from the port injection valve 2. Accordingly, the port injection significantly promotes the mixing of fuel with air, which in turn promotes evaporation of fuel. Thus, the amount of unburned HC in exhaust gas is effectively lowered, and the exhaust gas temperature and the catalyst temperature Tc are lowered. It is possible to make the increase rate of the fuel injection amount of the port injection valve 2 the same as that of the in-cylinder injection valve 3. A mode for controlling the injection valves 2, 3 when increasing the total fuel injection amount TAU may be set according to the engine operational state (including the engine rotational speed NE, the engine load KL, the fuel injection mode, the fuel injection ratio between the injection valves 2, 3).

If the catalyst temperature Tc is determined to be lower than the corrected upper temperature limit Tlc at step S102 after increasing the total fuel injection amount TAU, the procedure proceeds to the normal injection at step S108. On the other hand, if the catalyst temperature Tc is higher than or equal to the corrected upper temperature limit Tlc, the procedure from step S103 to step S107 is repeated until the catalyst temperature Tc falls below the corrected upper temperature limit Tlc. When the decrease rate of the catalyst temperature Tc is lower than a predetermined value, the control apparatus 10 may increase the total fuel injection amount TAU, thereby causing at least the port injection valve 2 to inject fuel, that is, the control apparatus 10 may repeat the procedure of steps 106 and 107. In this case, the catalyst temperature Tc is quickly lowered due to the decrease in the air-fuel ratio A/F. Thus, the durability of the three-way catalyst 9 is prevented from being degraded by a high temperature.

Next, a procedure for determining the fuel injection amount ratio between the port injection valve 2 and the in-cylinder injection valve 3 will be described. The injection control section 23 determines the fuel injection amount ratio between the port injection valve 2 and the in-cylinder injection valve 3 according to the procedure shown in the flowchart of FIG. 6. First, at step S201, the injection control section 23 obtains the total fuel injection amount TAU from the ECU, which amount TAU is computed by the ECU 30 based on the engine operational state including the engine load KL and the engine rotational speed NE. The injection control section 23 may obtain the engine operational state including the engine load KL and the engine rotational speed NE from the ECU 30, and compute the total fuel injection amount TAU based on the obtained information.

At the subsequent step S202, the injection control section 23 determines whether the total fuel injection amount TAU needs to be increased. A case where the total fuel injection amount TAU needs to be increased refers to a case where the catalyst temperature Tc will not be sufficiently lowered by increasing the fuel injection amount ratio of the port injection valve 2. This corresponds to a case where the outcome of step S105 of FIG. 3 is positive. When determining that the total fuel injection amount TAU needs to be increased, the injection control section 23 proceeds to step S203. At step S203, the injection control section 23 adds a fuel increase amount a to the total fuel injection amount TAU obtained at step S201, and sets the resultant as the final value of the total fuel injection amount TAU. On the other hand, when determining that the total fuel injection amount TAU does not need to be increased, the injection control section 23 proceeds to step S204. At step S204, the injection control section 23 sets the total fuel injection amount TAU obtained at step S201 as the final value of the total fuel injection amount TAU.

At the subsequent step S205, the combustion determining section 21 determines whether the engine operational state is in an operation range in which the homogeneous combustion is performed (homogenous combustion region). If the engine operational state is in the homogeneous combustion region, the injection control section 23 at step S206 determines a ratio K of the amount fuel injected from the port injection valve 2 to the total fuel injection amount TAU (hereinafter, simply referred to as injection amount ratio K).

Figure 7:
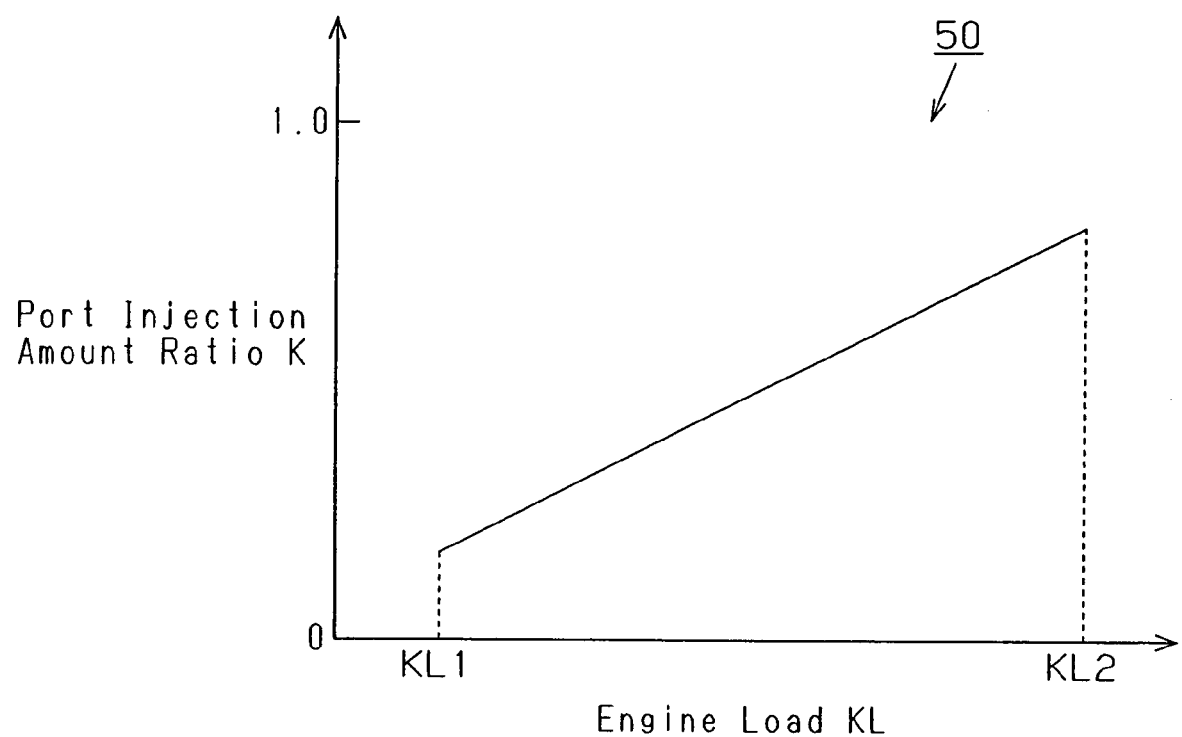
FIG. 7 is a graph showing an example of a fuel injection ratio map that defines the injection amount ratio of the port injection valve in relation to engine load.

FIG. 7 is a graph showing an example of a fuel injection ratio map that sets the injection amount ratio K of the port injection valve 2 to the engine load KL. As shown in FIG. 7, the injection amount ratio K is set to increase as the engine load KL increases. The injection amount ratio map 50 is stored in the memory section 10*m* of the control apparatus 10 in advance. The injection control section 23 obtains the injection amount ratio K by referring to the injection amount ratio map 50 of FIG. 7 based on the engine load KL obtained through the ECU 30. When setting the injection amount ratio map 50, parameters indicating the engine operational state other than the engine load KL (for example, the engine rotational speed NE) may be taken into consideration.

At the subsequent step S207, the injection control section 23 determines whether the injection amount ratio of the port injection valve 2 needs to be increased. A case where the injection amount ratio of the port injection valve 2 needs to be increased refers to a case where the catalyst temperature Tc becomes higher than or equal to a predetermined reference value (the corrected upper temperature limit Tlc) when the engine 1 is operating using at least the in-cylinder injection valve 3. This corresponds to a case where the outcome of step S102 of FIG. 3 is positive. When determining that the injection amount ratio of the port injection valve 2 needs to be increased, the injection control section 23 proceeds to step S208. At step S208, the injection control section 23 adds a ratio increase amount β to the injection ratio K determined at step S206, and sets the resultant as the final value of the injection amount ratio K. On the other hand, when determining that the injection amount ratio of the port injection valve 2 does not need to be increased, the injection control section 23 proceeds to step S209. At step S209, the injection control section 23 sets the injection amount ratio K determined at step S206 as the final value of the injection amount ratio K.

After determining the injection amount ratio K, the injection control section 23 at step S210 determines a fuel injection amount Qp of the port injection valve 2 and a fuel injection amount Qd of the in-cylinder injection valve 3 using the injection amount ratio K according to the following equation.

$$Qp = K \times TAU$$

$$Qd = (1-K) \times TAU$$

Therefore, when the engine operational state is in the homogeneous combustion region, the port injection valve 2 and the in-cylinder injection valve 3 inject fuel in accordance with the fuel injection amounts Qp, Qd determined at step S210 at steps S104, S107, and S108.

On the other hand, when the engine operational state is determined to be out of the homogenous combustion region at step S205, in other words, when the engine operational state is determined to be in an operational range where the stratified combustion is performed (stratified combustion region), the procedure proceeds to step S211. At step S211, the injection control section 23, as at step S207, determines whether the injection amount ratio of the port injection valve 2 needs to be increased. When the injection amount ratio of the port injection valve 2 does not need to be increased, the injection control section 23 proceeds to step S212. At step S212, the injection control section 23 sets the fuel injection amount Qp of the port injection valve 2 to zero and sets the fuel injection amount Qd of the in-cylinder injection valve 3 to the total fuel injection amount TAU, so that the engine 1 operates with fuel injection from only the in-cylinder injection valve 3.

On the other hand, when the injection amount ratio of the port injection valve 2 needs to be increased, the injection control section 23 increases the injection amount ratio of the port injection valve 2 at step S213. In this embodiment, the fuel injection amount Qp of the port injection valve 2 is set to the total fuel injection amount TAU, and the fuel injection amount Qd of the in-cylinder injection valve 3 is set to zero. That is, if the three-way catalyst 9 is not in an overtemperature condition when the engine operational state is in the stratified combustion region, the stratified combustion is performed with fuel of the total injection amount TAU injected from the in-cylinder injection valve 3. If the three-way catalyst 9 is in an overtemperature condition, the homogeneous combustion is performed with fuel of the total injection amount TAU injected from the port injection valve 2.

In this manner, even if the engine operational state is in the stratified combustion region, fuel is injected from the port injection valve 2 so that mixing of fuel and air is promoted, which promotes evaporation of fuel. As a result, the amount of unburned HC in exhaust gas is reduced, and the exhaust gas temperature and the catalyst temperature Tc are lowered. Even if the engine operational state is in the stratified combustion region, the injection amount ratio of the port injection valve 2 may be changed according to the engine operational state such as the engine load KL and the engine rotational speed NE as in the homogeneous combustion region. For example, if the catalyst temperature becomes higher than or equal to a predetermined reference value when the engine operational state is in the stratified combustion region, the injection amount ratio of the port injection valve 2 may be increased as the engine load KL is increased.

As described above, in this embodiment, whether the catalyst temperature Tc becomes higher than or equal to a predetermined reference value (the corrected upper temperature limit Tlc) is determined based on a parameter related to the catalyst temperature Tc. If the catalyst temperature Tc becomes higher than or equal to the reference value, the fuel injection amount from the port injection valve 2 is increased compared to the case where the catalyst temperature Tc is lower than the reference value. Therefore, an overtemperature condition of the three-way catalyst 9 is reliably and accurately detected, and the catalyst temperature Tc is readily lowered to reliably prevent the three-way catalyst 9 from being overheated.

Further, in the present embodiment, when the catalyst temperature Tc becomes higher than or equal to the reference value, the fuel injection amount ratio of the port injection valve 2 is first increased without changing the total fuel injection amount TAU. Therefore, the catalyst temperature Tc is reliably lowered while preventing the fuel economy from deteriorating and while limiting the influence to the air-fuel ratio A/F.

For example, when the catalyst temperature Tc increases due to insufficient formation of fuel spray from the in-cylinder injection valve 3, fuel is injected from the port injection valve 2 so that the air-fuel ratio A/F is prevented from increasing (air-fuel mixture is prevented from being lean). Accordingly, the air-fuel ratio A/F is maintained at the target value, and the overtemperature of the catalyst 9 is suppressed.

The configuration of the present embodiment is applicable to either of a case where the engine operational state is in the homogenous combustion region or in the stratified combustion region. However, since it effectively lowers the catalyst temperature, the configuration is particularly suitable for a high load and high output operation (homogeneous combustion region), in which the catalyst temperature is likely to increase. Further, the configuration of the present embodiment is applicable to other embodiments, which will be discussed below.

A second embodiment of the present invention will now be described with reference to FIGS. 8 and 10. The differences from the first embodiment of FIGS. 1 to 7 will mainly be discussed. This embodiment is different from the first embodiment mainly in the following points. That is, in this embodiment, when the port injection valve and the in-cylinder injection valve 3 are both injecting fuel, an actual air-fuel ratio AF1 is compared with a target air-fuel ratio AFa prior to the determination of the catalyst temperature Tc. Then, the fuel injection amount of the port injection valve 2 or the in-cylinder injection valve 3 is increased such that the actual air-fuel injection valve AF1 seeks the target air-fuel ratio AFa. Like or the same reference numerals are given to those components that are like or the same as the corresponding components of the first embodiment and detailed explanations are omitted. Refer to FIG. 1 as necessary.

Figure 8:
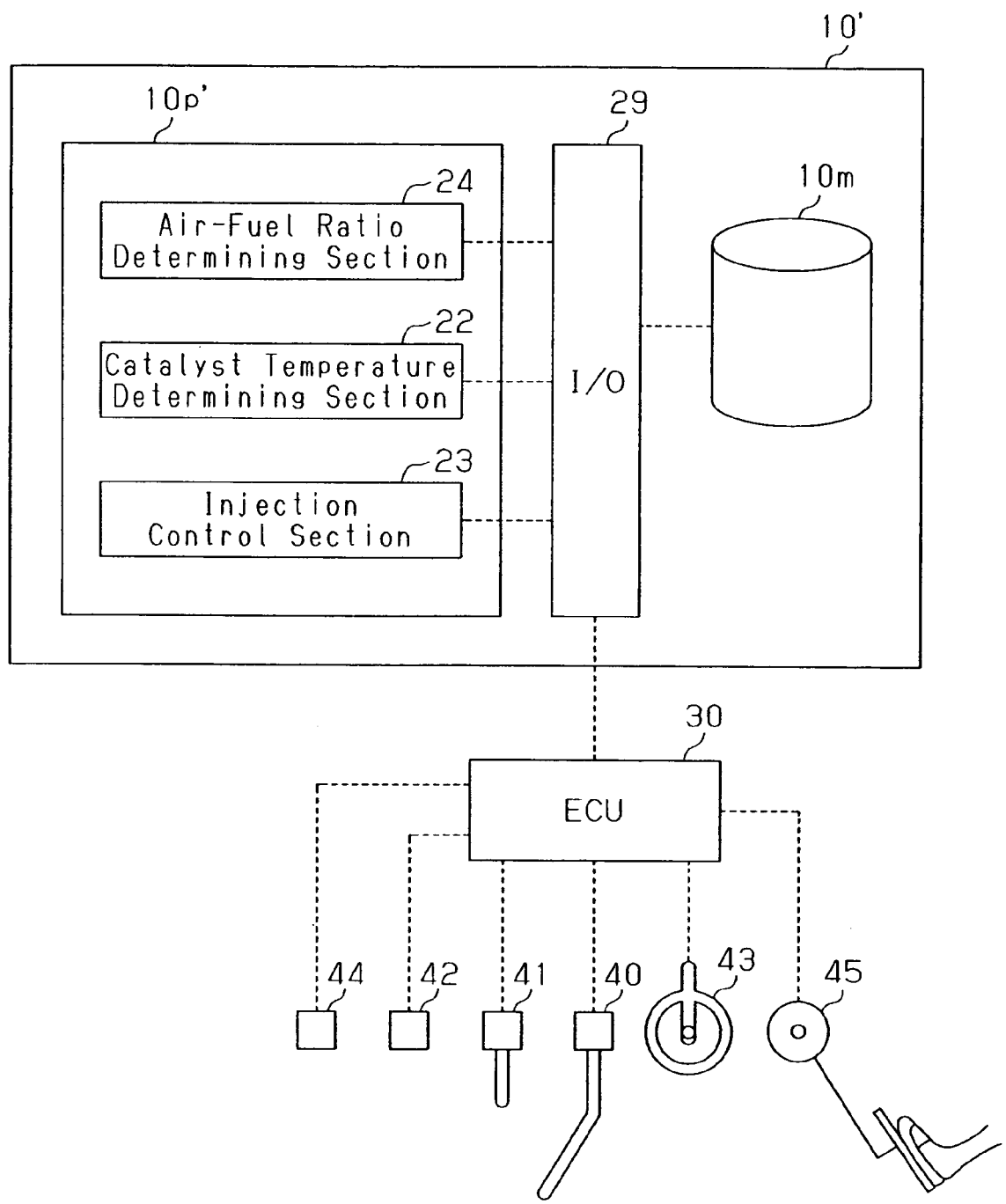
FIG. 8 is a block circuit diagram illustrating a control apparatus of an internal combustion engine according to a second embodiment of the present invention.

As shown in FIG. 8, a processing section 10p' of a control apparatus 10' according to the present embodiment includes an air-fuel ratio determining section 24.

Figure 9:
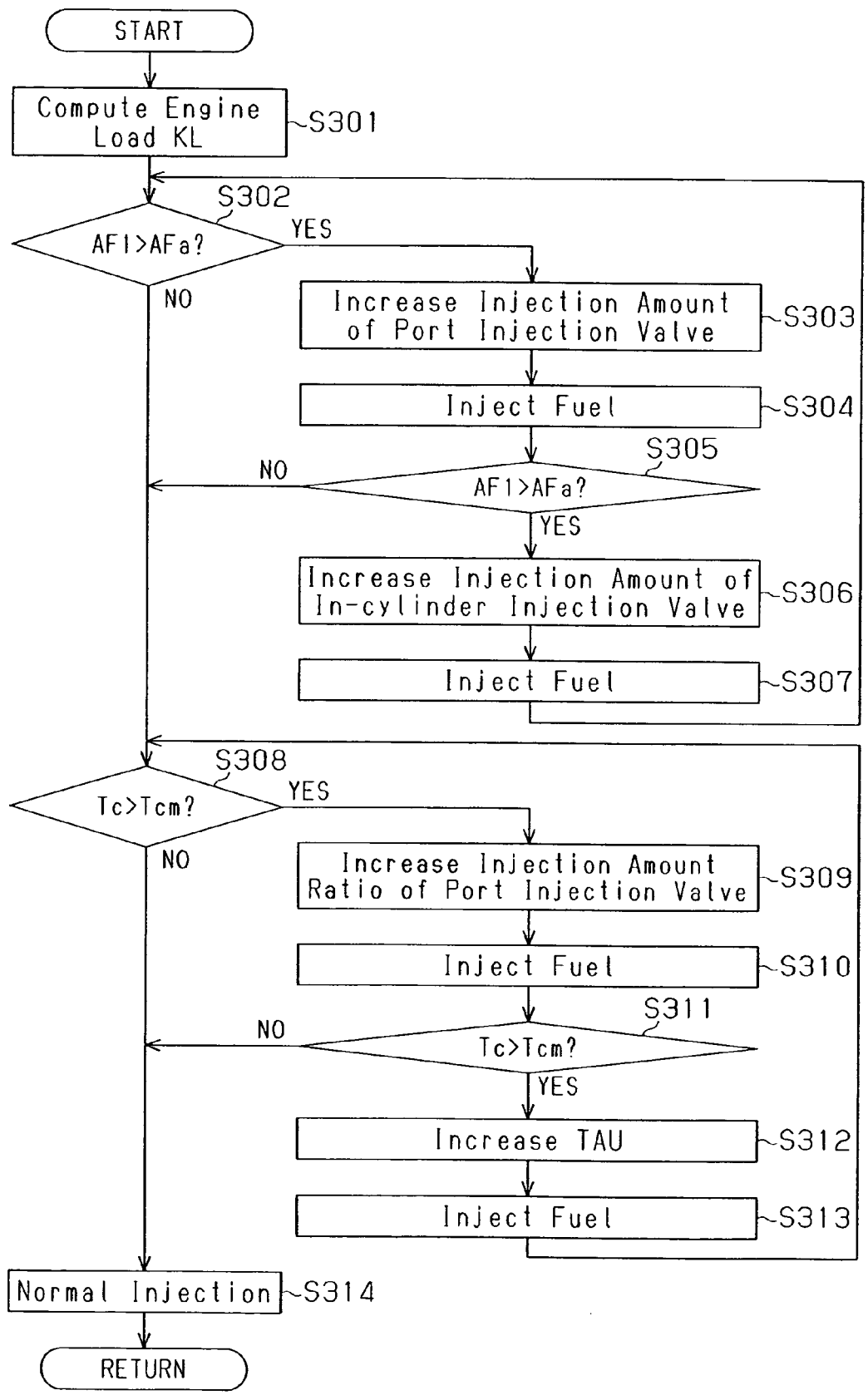
FIG. 9 is a flowchart showing a procedure for controlling fuel injection according to the second embodiment.

A fuel injection controlling procedure according to the present embodiment will now be described with reference to the flowchart of FIG. 9. First, at step S301, the ECU 30 obtains information such as the engine rotational speed NE and the intake air flow rate GA, thereby computing the engine load KL and other values. Based on the engine load KL, the engine rotational speed NE, and other parameters, the total fuel injection amount TAU is computed.

At step S302, the air-fuel ratio determining section 24 compares the air-fuel ratio A/F obtained from the output of the A/F sensor 41, or the actual air-fuel ratio AF1 during the operation of the engine 1, with the target air-fuel ratio AFa. When the actual air-fuel ratio AF1 is more than the target air-fuel ratio AFa, that is, when the engine 1 is operating with lean air-fuel mixture, it is assumed that there is a malfunction such as insufficient formation of fuel spary in at least one of the port injection valve 2 and the in-cylinder injection valve 3, causing abnormal combustion or unstable combustion.

Thus, if the actual air-fuel ratio AF1 is more than the target air-fuel ratio AFa at step S302, it is assumed that there is an abnormality in the in-cylinder injection valve 3. This is because since fuel of higher pressure is supplied to the in-cylinder injection valve 3 compared to the port injection valve 2, the possibility of malfunctioning is higher in the in-cylinder injection valve 3 than in the port injection valve 2. Also, since the in-cylinder injection valve 3 injects fuel into the cylinder 1S, in which combustion takes place, foreign matter such as carbon deposits is likely to collect on the in-cylinder injection valve 3. For these reasons, if the actual air-fuel ratio AF1 is more than the target air-fuel ratio AFa at step S302, the injection control section 23 increases the fuel injection amount Qp of the port injection valve 2 at step S303. Specifically, the injection control section 23 adds a predetermined fuel increase amount γ to the fuel injection amount Qp of the port injection valve 2 in the total fuel injection amount TAU and sets the resultant (Qp+γ) as a corrected fuel injection amount Qp1 of the port injection valve 2. At step S304, the port injection valve 2 injects fuel the amount of which corresponds to the corrected fuel injection amount Qp1.

At the subsequent step S305, the air-fuel ratio determining section 24 obtains the actual air-fuel ratio AF1 from the A/F sensor 41 again, and compares it with the target air-fuel ratio AFa. If the outcome of step S305 is negative, that is, if the actual air-fuel ratio AF1 is less than or equal to the target air-fuel ratio AFa, the catalyst temperature determining section 22 proceeds to step S308 and compares the catalyst temperature Tc with a predetermined reference value. In the present embodiment, the reference value is a catalyst map temperature Tcm that is set with respect to the catalyst temperature to determine whether the three-way catalyst 9 is in an overtemperature condition.

If the actual air-fuel ratio AF1 becomes less than or equal to the target air-fuel ratio AFa at step S305 after the port injection valve 2 injects fuel the amount of which corresponds to the corrected fuel injection amount Qp1, which is an increased fuel injection amount, it is assumed that there is an abnormality in the in-cylinder injection valve 3. The assumption result is preferably stored in the memory of the ECU 30 so that the cause of the abnormality is easily identified during maintenance. Also, it may be configured that when the number of increase of the fuel injection amount of the port injection valve 2 reaches a predetermined number, notice may be served to encourage the driver to perform maintenance.

If the outcome of step S305 is positive, that is, if the actual air-fuel ratio AF1 is more than the target air-fuel ratio AFa despite increase of the fuel injection amount from the port injection valve 2, it is assumed that there is also an abnormality in the port injection valve 2. In this case, the injection control section 23 increases the fuel injection amount Qd of the in-cylinder injection valve 3 at step S306. Specifically, the injection control section 23 adds a predetermined fuel increase amount 6 to the fuel injection amount Qd of the in-cylinder injection valve 3 in the total fuel injection amount TAU and sets the resultant (Qd+δ) as a corrected fuel injection amount Qd1 of the in-cylinder injection valve 3. At step S307, the in-cylinder injection valve 3 injects fuel the amount of which corresponds to the corrected fuel injection amount Qd1. As in the case of the in-cylinder injection valve 3, if it is assumed that there is an abnormality in the port injection valve 2, the assumption result is preferably stored in the memory of the ECU 30.

Figure 10:
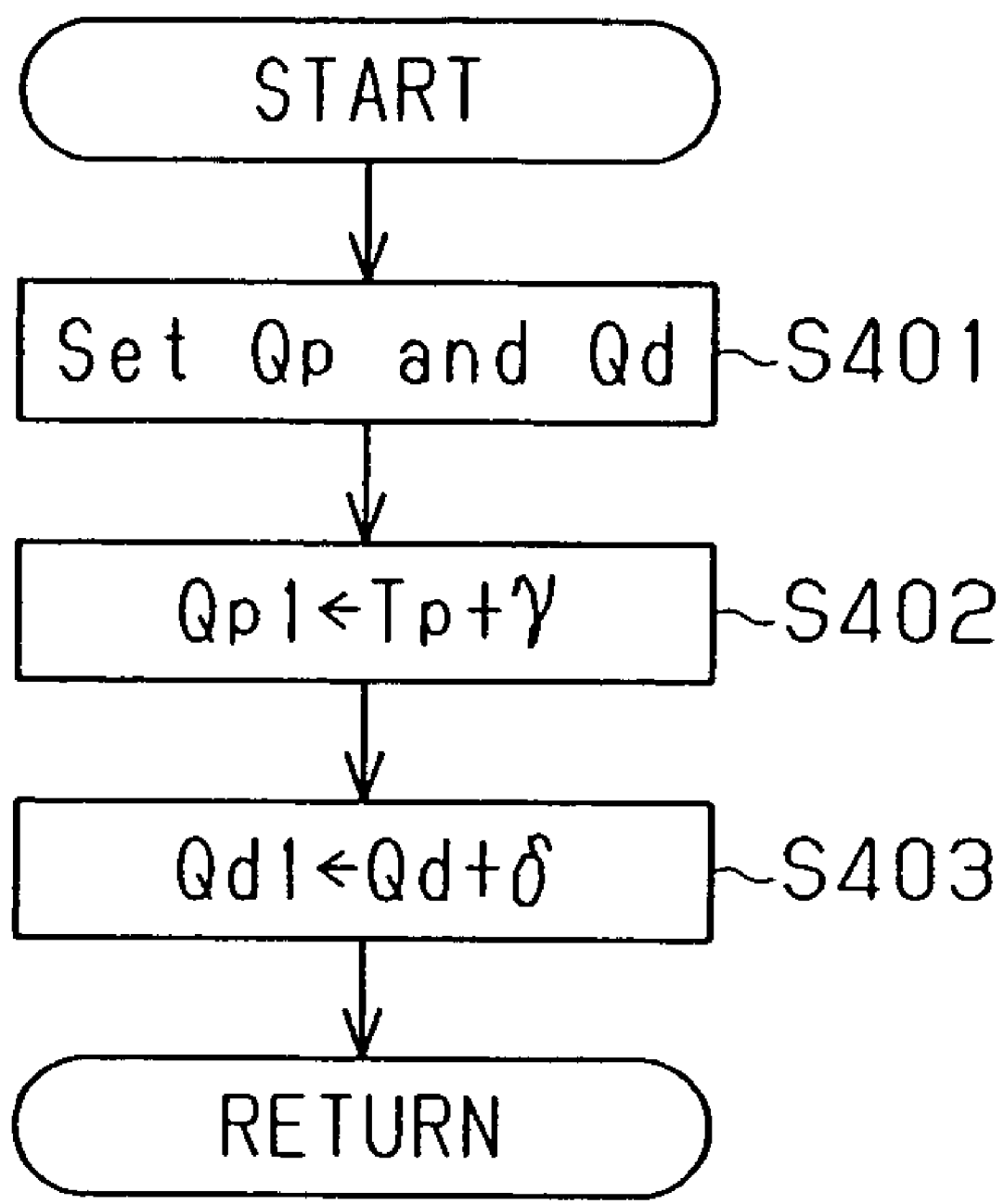
FIG. 10 is a flowchart showing a procedure for setting a fuel injection amount.

FIG. 10 is a flowchart showing a procedure for determining a fuel injection amount. The injection control section 23 determines the fuel injection amount of the port injection valve 2 and the in-cylinder injection valve 3 according to the procedure shown in the flowchart of FIG. 10. First, at step S401, the injection control section 23 determines ratio between the fuel injection amount of the port injection valve 2 and the fuel injection amount of the in-cylinder injection valve 3 based on the engine operational state and other factors. Then, based on the ratio and the total fuel injection amount TAU obtained from the engine load KL, the engine rotational speed NE, and other parameters, the injection control section 23 determines the fuel injection amount Qp of the port injection valve 2 and the fuel injection amount Qd of the in-cylinder injection valve 3.

At step S420, the injection control section 23 adds a predetermined fuel increase amount γ to the fuel injection amount Qp and sets the resultant (Qp+γ) as a corrected fuel injection amount Qp1 of the port injection valve 2. The corrected fuel injection amount Qp1 is used for increasing the fuel injection amount Qp of the port injection valve 2 at step S303 of FIG. 9. Next, at step S403, the injection control section 23 adds a predetermined fuel increase amount δ to the fuel injection amount Qd and sets the resultant (Qp+δ) as a corrected fuel injection amount Qd1 of the in-cylinder injection valve 3. The corrected fuel injection amount Qd1 is used for increasing the fuel injection amount Qd of the in-cylinder injection valve 3 at step S306 of FIG. 9. If the fuel injection amount of the injection valves 2, 3 is increased, the subsequent control is executed using the increased fuel injection amount as a reference value.

Referring back to FIG. 9, whether the actual air-fuel ratio AF1 is more than the target air-fuel ratio AFa is determined again at step S302 subsequent to step S307. If the actual air-fuel ratio AF1 is more than the target air-fuel ratio AFa, steps S303 to S307 are repeated until the actual air-fuel ratio AF1 becomes less than or equal to the target air-fuel ratio AFa, and the injection amounts Qp, Qd are increased by the fuel increase amounts γ, δ, respectively. When the actual air-fuel ratio AF1 becomes less than or equal to the target air-fuel ratio AFa, the catalyst temperature Tc is compared with the catalyst map temperature Tcm, which is a predetermined reference value, at step S308.

The process of steps S308 to S314 is substantially the same as the process of steps S102 to S108 of FIG. 3 except that the catalyst map temperature Tcm is used the predetermined reference value instead of the corrected upper temperature limit Tlc.

If the catalyst temperature Tc is lower than the catalyst map temperature Tcm at step S308, the procedure proceeds to the normal injection of step S314. When steps S303 to S307 are executed, the fuel injection amounts of the injection valves 2, 3 in the normal injection are increased fuel injection amounts. On the other hand, if the catalyst temperature Tc is higher than or equal to the catalyst map temperature Tcm at step S308, it means that the three-way catalyst 9 is in an overtemperature condition despite the fact that the actual air-fuel ratio AF1 is normal. Operating the engine 1 in this state reduces the durability of the three-way catalyst 9. Thus, if the outcome of step S308 is positive, the injection control section 23 proceeds to step S309. At step S309, the injection control section 23 increases the fuel injection amount ratio of the port injection valve 2 without changing the total fuel injection amount TAU, thereby reducing the fuel injection amount ratio of the in-cylinder injection valve 3. At step S310, the port injection valve 2 and the in-cylinder injection valve 3 inject fuel at the determined injection amount ratio. The injection amount ratio of the port injection valve 2 is increased because, as described above, it is effective to lower the catalyst temperature Tc.

If the catalyst temperature Tc is determined to be lower than the catalyst map temperature Tcm at step S311, the procedure proceeds to step S314, at which the normal injection is performed. In this manner, the catalyst temperature Tc is lowered while suppressing deterioration of the fuel economy. Further, since actual air-fuel ratio AF1 is caused to seek the target air-fuel ratio AFa, HC and CO in exhaust gas are prevented from increasing.

On the other hand, when the outcome of step S311 is positive, that is, when the catalyst temperature determining section 22 determines that the catalyst temperature Tc stays equal to or above the catalyst map temperature Tcm even after the fuel injection amount ratio of the port injection valve 2 is increased, the catalyst temperature determining section proceeds to step S312. At step S312, the injection control section 23 increases the total fuel injection amount TAU. At step S313, the port injection valve 2 and the in-cylinder injection valve 3 are controlled to inject fuel the amount of which corresponds to the increased total fuel injection amount TAU. As a result, the exhaust gas temperature is lowered, and the catalyst temperature Tc is lowered.

If the catalyst temperature Tc is determined to be lower than the catalyst map temperature Tcm at step S308 after increasing the total fuel injection amount TAU, the procedure proceeds to step S314, at which the normal injection is performed. On the other hand, if the catalyst temperature Tc is higher than or equal to the catalyst map temperature Tcm, the procedure from step S309 to step S313 is repeated until the catalyst temperature Tc falls below the catalyst map temperature Tcm. In this manner, the catalyst temperature Tc is lowered below the catalyst map temperature Tcm, so that the durability of the three-way catalyst 9 is not reduced.

A third embodiment of the present invention will now be described with reference to FIGS. 11 and 12. In the present embodiment, an engine 1 has two three-way catalysts 9A and 9B. Each of the three-way catalysts 9A and 9B corresponds to two of four cylinders 1SA, 1SB, 1SC, and 1SD. When either one of the three-way catalyst 9A, 9B is in an overtemperature condition, fuel injection of cylinders corresponding the catalyst in an overtemperature condition is controlled to lower the temperature of the catalyst.

Figure 11:
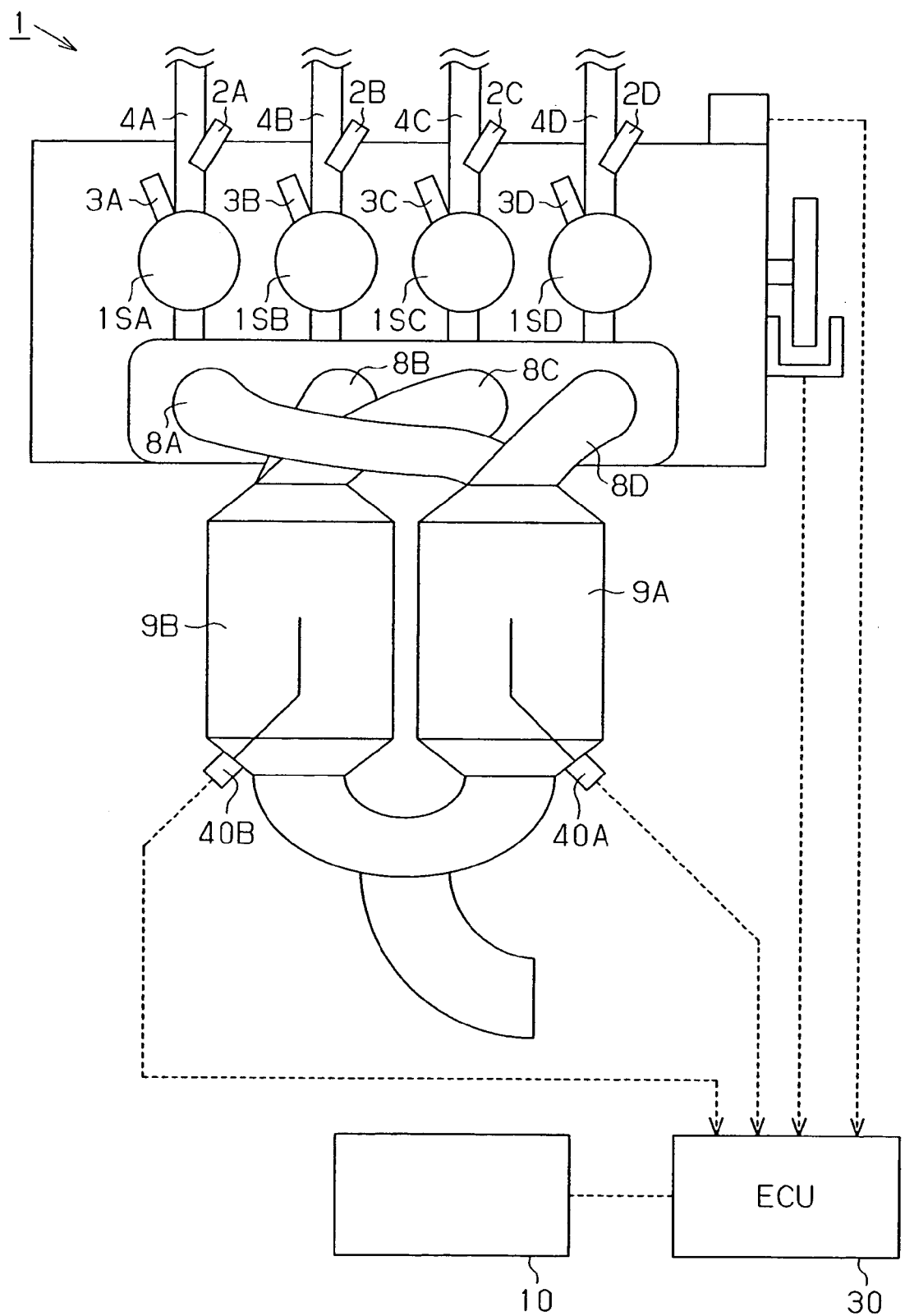
FIG. 11 is a schematic diagram illustrating an internal combustion engine and its control apparatus according to a third embodiment of the present invention.

As shown in FIG. 11, the engine 1 is an in-line four-cylinder engine, and includes the first three-way catalyst 9A and the second three-way catalyst 9B. First to fourth exhaust passages 8A to 8D each extend from one of the four cylinders 1SA to 1SD. Exhaust gas from the first and fourth cylinders 1SA and 1SD is conducted to the first three-way catalyst 9A through the corresponding exhaust passages 8A, 8D and is purified by the first three-way catalyst 9A. Exhaust gas from the second and third cylinders 1SB and 1SC is conducted to the second three-way catalyst 9B through corresponding exhaust passages 8B, 8C and is purified by the second three-way catalyst 9B.

The temperature of the first three-way catalyst 9A (first catalyst temperature Tc1) is detected by a first temperature sensor 40A, and the temperature of the second three-way catalyst 9B (second catalyst temperature Tc2) is detected by a second temperature sensor 40B. A first port injection valve 2A and a first in-cylinder injection valve 3A correspond to the first cylinder 1SA. A second port injection valve 2B and a second in-cylinder injection valve 3B correspond to the second cylinder 1SB. A third port injection valve 2C and a third in-cylinder injection valve 3C correspond to the third cylinder 1SC. A fourth port injection valve 2D and a fourth in-cylinder injection valve 3D correspond to the fourth cylinder 1SD. Although the engine 1 has the two three-way catalysts 9A, 9B in the example of FIG. 11, the engine 1 may have three or more three-way catalysts. The number of cylinders of the engine 1 is not limited four, but may be any number greater than one.

The basic configuration of the control apparatus 10 that controls the engine 1 is basically the same as that shown in FIG. 2. Therefore, refer to FIG. 2 as necessary for the description of the configuration of the control apparatus 10.

Figure 12:
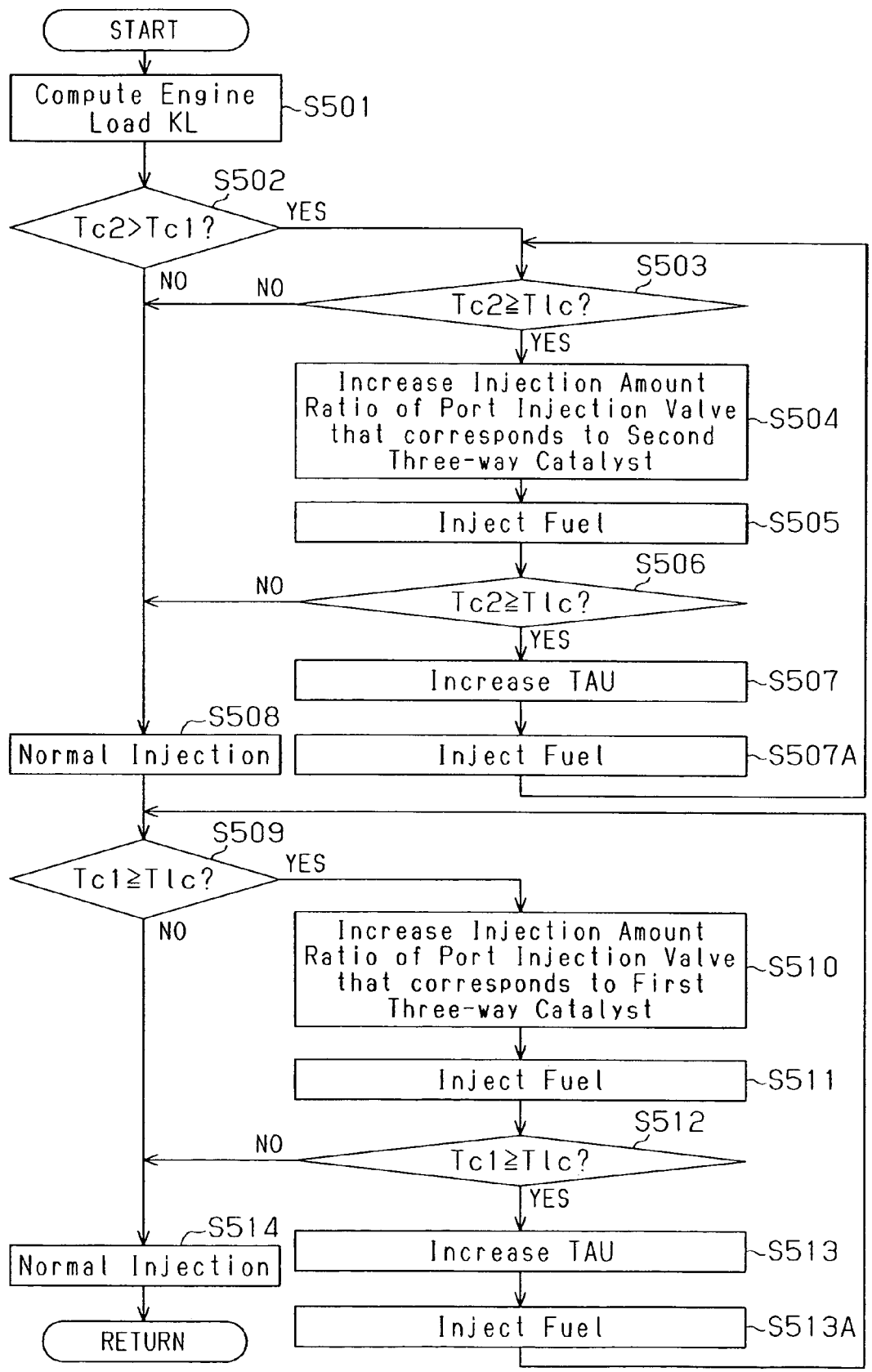
FIG. 12 is a flowchart showing a procedure for controlling fuel injection according to the third embodiment.

FIG. 12 is a flowchart showing a procedure of fuel injection control according to this embodiment. When performing the procedure, it is assumed that the engine 1 is operating using at least the first to fourth in-cylinder injection valves 3A to 3D.

First, at step S501, the ECU 30 obtains information such as the engine rotational speed NE and the intake air flow rate GA, thereby computing the engine load KL and other values. Based on the engine load KL, the engine rotational speed NE and other values, the ECU 30 or the injection control section 23 computes the total fuel injection amount TAU.

Next, at step S502, the catalyst temperature determining section 22 compares the first catalyst temperature Tc1 obtained from the first temperature sensor 40A with the second catalyst temperature Tc2 obtained from the second temperature sensor 40B. If the outcome of step S502 is positive, that is, if the second catalyst temperature Tc2 is higher than the first catalyst temperature Tc1, the catalyst temperature determining section 22 proceeds to step S503. At step S503, the catalyst temperature determining section 22 determines whether the second catalyst temperature Tc2 is higher than or equal to the corrected upper temperature limit Tlc. As in the flowchart of FIG. 3, the corrected upper temperature limit Tlc (Tlc=Tl−δT) is used as a reference value for determining the catalyst temperature in this embodiment.

If the second catalyst temperature Tc2 is lower than the corrected upper temperature limit Tlc, it is determined that the second catalyst temperature Tc2 is normal and that there is no abnormal temperature increase in the second three-way catalyst 9B. Thus, the procedure proceeds to step S508, at which the normal fuel injection is performed. On the other hand, if the second catalyst temperature Tc2 is higher than or equal to the corrected upper temperature limit Tlc, it is determined that the second catalyst temperature Tc2 has substantially reached the upper temperature limit Tl of the second three-way catalyst 9B. Therefore, if the engine 1 continues operating in this state, an overtemperature condition of the second three-way catalyst 9B degrades the performance and the durability of the second three-way catalyst 9B.

When the outcome of step S503 is positive, the injection control section 23 executes control for lowering the second catalyst temperature Tc2. Specifically, the injection control section 23 increases the ratio of the fuel injection amount from the second and third port injection valves 2B and 2C without changing the total fuel injection amount TAU, thereby reducing the ratio of the fuel injection amount from the second and third in-cylinder injection valves 3B and 3C. At step S505, the second and third port injection valves 2B, 2C and the second and third in-cylinder injection valves 3B, 3C are controlled to inject fuel at the determined injection amount ratio.

At step S506, the catalyst temperature determining section 22 determines whether the second catalyst temperature Tc2 is higher than or equal to the corrected upper temperature limit Tlc. When the second catalyst temperature Tc2 falls below the corrected upper temperature limit Tlc, the procedure proceeds to step S508, at which the normal injection is performed.

On the other hand, when the outcome of step S506 is positive, that is, when the second catalyst temperature Tc2 stays equal to or above the corrected upper temperature limit Tlc even after the fuel injection amount ratio of the second and third port injection valves 2B, 2C is increased, the injection control section 23 increases the total fuel injection amount TAU at step S507. At step S507A, the second and third port injection valves 2B, 2C and the second and third in-cylinder injection valves 3B, 3C are controlled to inject fuel the amount of which correspond to the increased total fuel injection amount TAU. This lowers the air-fuel ratio A/F and richens the air-fuel mixture. Accordingly, the exhaust gas temperature and the second catalyst temperature Tc2 are lowered.

If the second catalyst temperature Tc2 is determined to be lower than the corrected upper temperature limit Tlc at step S503 after increasing the total fuel injection amount TAU, the procedure proceeds to step S508, at which the normal injection is performed. The procedure then proceeds to step S509 so that monitoring of the first catalyst temperature Tc1 is started. On the other hand, if the second catalyst temperature Tc2 is higher than or equal to the corrected upper temperature limit Tlc, the procedure from step S503 to step S507A is repeated until the second catalyst temperature Tc2 falls below the corrected upper temperature limit Tlc. When the decrease rate of the second catalyst temperature Tc2 is lower than a predetermined value, the control apparatus 10 may increase the total fuel injection amount TAU, thereby causing at least the port injection valves 2B, 2C to inject fuel, that is, the control apparatus 10 may repeat the procedure of steps S507 and S507A. In this case, the second catalyst temperature Tc2 is quickly lowered, and the durability of the second three-way catalyst 9B is prevented from being degraded by high temperature.

If the first catalyst temperature Tc1 is determined to be higher than the second catalyst temperature Tc2 at step S502, it is determined that the second three-way catalyst 9B is not in an overtemperature condition, but is functioning normally. Thus, normal injection is performed at step S508. At the subsequent step S509, the catalyst temperature determining section 22 determines whether the first catalyst temperature Tc1 is higher than or equal to the corrected upper temperature limit Tlc. When the first catalyst temperature Tc1 is determined to be lower than the corrected upper temperature limit Tlc, the procedure proceeds to step S514, at which the normal injection is performed. Then, the procedure returns to step S501 and the monitoring of the first and second catalyst temperatures Tc1, Tc2 is continued.

On the other hand, if the first catalyst temperature Tc1 is determined to be higher than or equal to the corrected upper temperature limit Tlc, the injection control section 23 executes a process for lowering the first catalyst temperature Tc1 at steps S510 to S513A. The process of steps S510 to S513A is the same as the process of the above described steps S504 to S507A except that the subjects of the control are the first and fourth port injection valves 2A, 2D and the first and fourth in-cylinder injection valves 3A, 3D. Therefore, the description of the process of steps S510 to S513A is omitted. The ratio between the fuel injection amounts of the port injection valves and the in-cylinder injection valves can be determined according to the procedure of the flowchart shown in FIG. 6.

In the present embodiment, fuel injection control for lowering the catalyst temperature is performed only for cylinders corresponding to overheated ones of the three-way catalysts 9A, 9B. Therefore, the temperature of overheated catalysts is favorably lowered. Also, since fuel is not supplied in a quantity more than necessary to cylinders corresponding to non-overheated catalysts, the fuel economy is prevented from deteriorating.

A fourth embodiment according to the present invention will now be described with reference to FIGS. 13 to 15(b). Like or the same reference numerals are given to those components that are like or the same as the corresponding components of the first embodiment of FIGS. 1 to 7 and detailed explanations are omitted.

Figure 13:
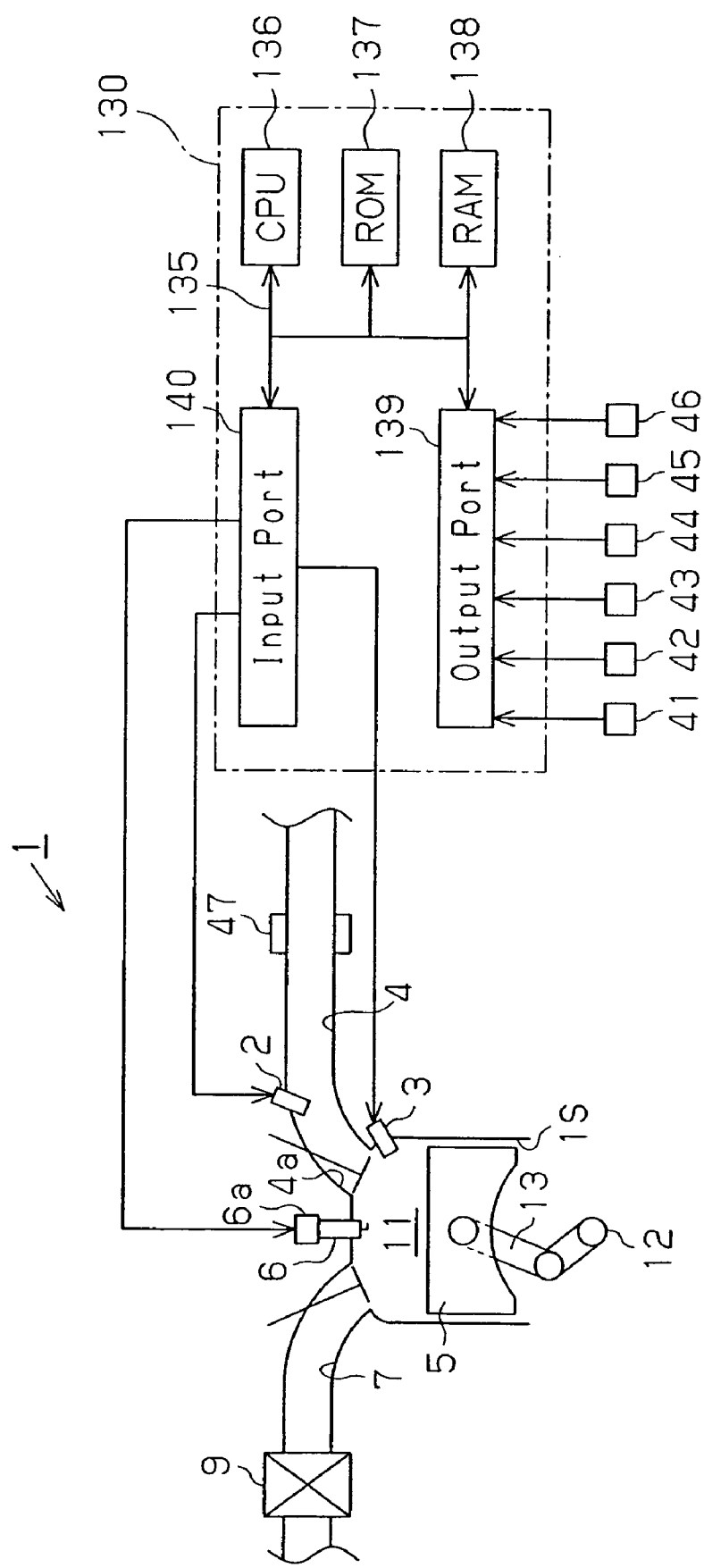
FIG. 13 is a schematic diagram illustrating an internal combustion engine and its control apparatus according to a fourth embodiment of the present invention.

As shown in FIG. 13, an engine 1 of the present embodiment has an exhaust temperature sensor 46 for detecting the temperature of exhaust gas. Reference numeral 47 represents a surge tank provided in the intake passage 4.

An ECU 130 corresponds to the control apparatus 10 and the ECU 30 shown in FIG. 2, and is configured by a digital computer. The ECU 130 includes a CPU 136, a ROM 137, a RAM 138, an input port 139, and an output port 140, which are interconnected by a bidirectional bus 135.

Figure 14:
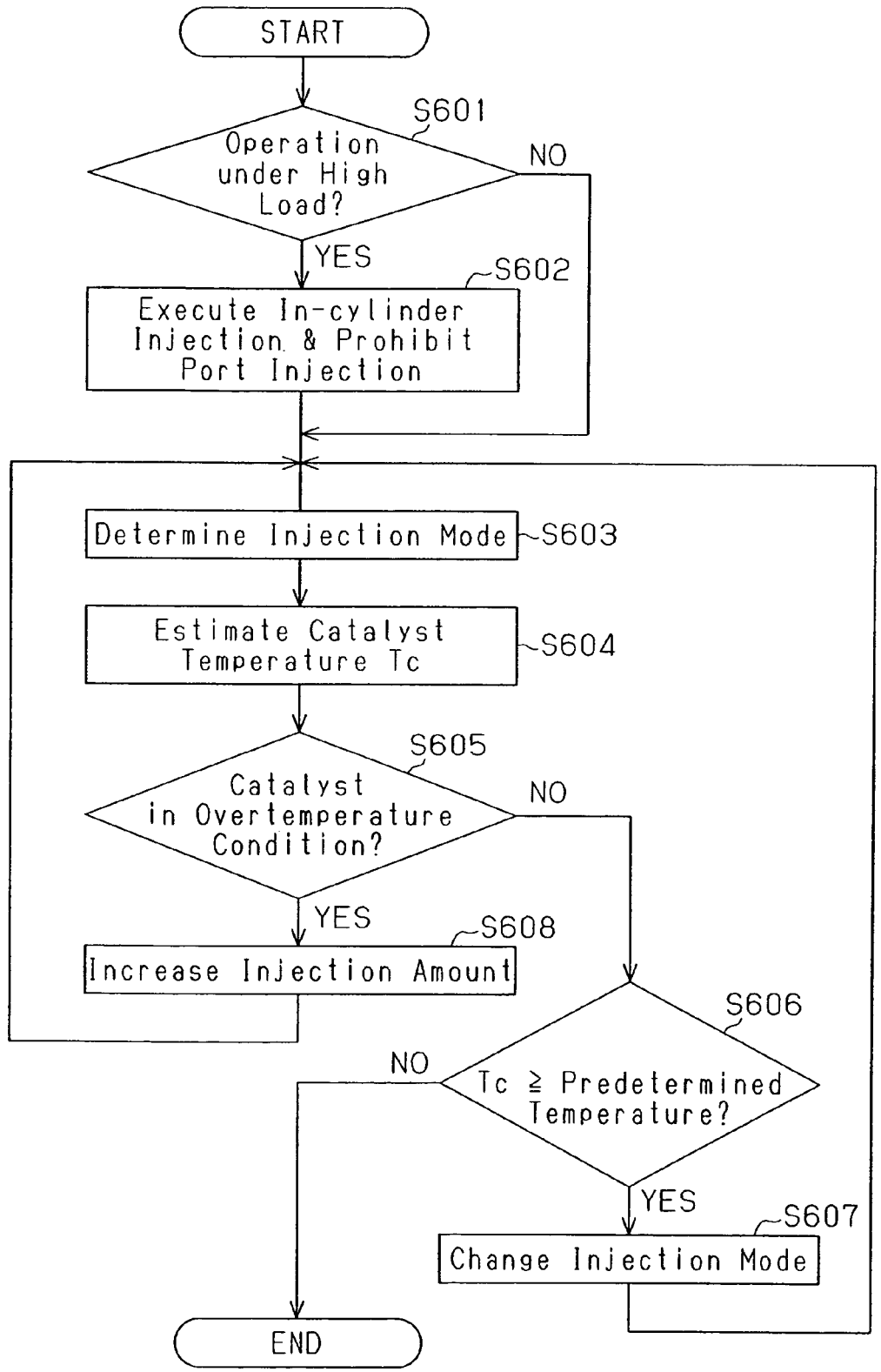
FIG. 14 is a flowchart showing a procedure for controlling fuel injection according to the fourth embodiment.
Figure 15A:
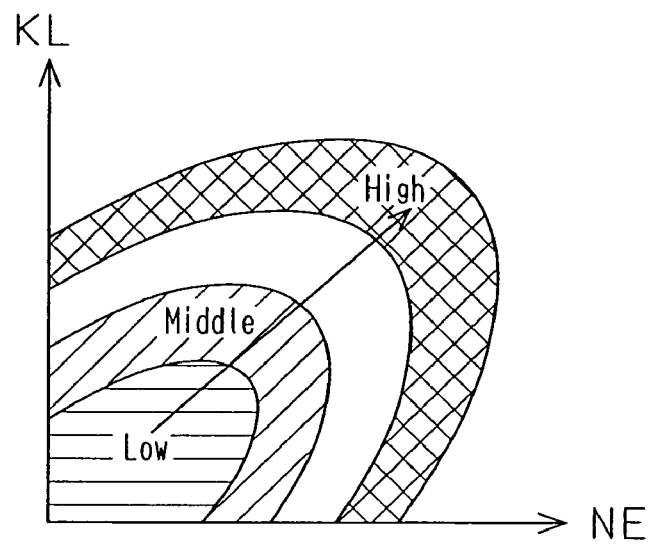
FIGS. 15(a) and 15(b) show examples of maps that are referred to for obtaining a steady temperature.
Figure 15B:
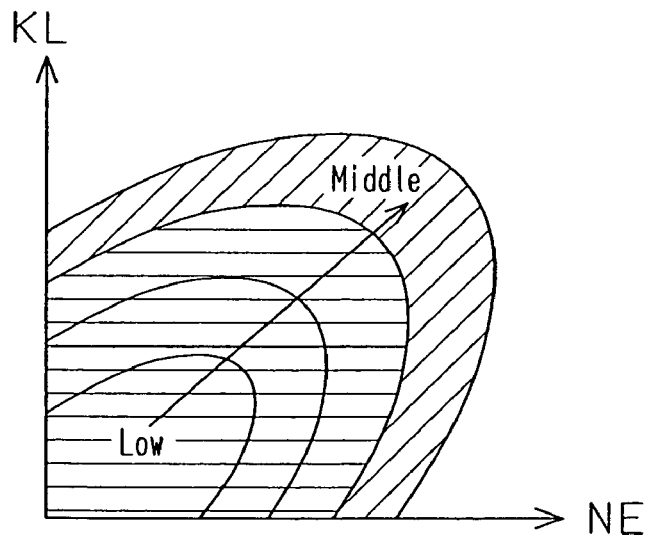

FIG. 14 is a flowchart showing a procedure of fuel injection control according to this embodiment. When performing the procedure, it is assumed that the engine 1 is operating using at least the in-cylinder injection valve 3. First at step S601, the ECU 130 determines whether the engine 1 is operating under high load. If the engine 1 is operating under high load, the ECU 130 sets a fuel injection mode for causing the in-cylinder injection valve 3 to inject fuel and prohibiting the port injection valve 2 from injecting fuel. Then, the ECU 130 proceeds to step S603. If the engine 1 is not operating under high load, the ECU 130 sets an injection mode that is different from the injection mode set at step S602, and proceeds to step S706 of FIG. 603.

At step S603, the ECU 130 determines the fuel injection mode. Specifically, the ECU 130 determines the ratio between the fuel injection amount of the in-cylinder injection valve 3 and the fuel injection amount of the port injection valve 2. For example, when the engine 1 is operating under high load and the in-cylinder injection is being performed, the fuel injection amount ratio (in-cylinder injection: port injection) is 10:0. Next at step S604, the ECU 130 estimates the temperature of the three-way catalyst 9 (catalyst temperature Tc) using steady temperature maps (refer to FIGS. 15(a) and 15(b)) that correspond to the determined fuel injection mode (injection amount ratio). The method for estimating the catalyst temperature Tc will be described below.

Subsequently, at S604, the ECU 130 determines whether the three-way catalyst 9 is in an overtemperature condition based on the estimated catalyst temperature Tc. The determination can be carried out by comparing the catalyst temperature Tc with a predetermined reference temperature as in the first embodiment. When determining that the catalyst 9 is not in an overtemperature condition, the ECU 130 proceeds to step S606. At step S606, the ECU 130 determines whether the estimated temperature Tc is higher than or equal to a predetermined temperature. The predetermined temperature is lower than a temperature (the reference value mentioned above) for determining whether the catalyst 9 is in an overtemperature condition. The predetermined temperature is used as a threshold value for determining whether there is a possibility that the catalyst 9 may be in an overtemperature condition.

If the estimated catalyst temperature Tc is higher than or equal to the predetermined temperature, the ECU 130 proceeds to step S607 and changes the fuel combustion mode. Specifically, the ECU 130 changes the fuel injection amount ratio between the in-cylinder injection valve 3 and the port injection valve 2 such that the ratio of the fuel injection amount ratio of the port injection valve 2 to that of the in-cylinder injection valve 3 is increased from the current state. The total fuel injection amount of the in-cylinder injection valve 3 and the port injection valve 2, or the total amount of fuel injection supplied to the cylinder 1S, is not changed. The ratio of the port injection amount to the in-cylinder injection amount can be interpreted as the ratio of the port injection amount to the total amount fuel supplied to the cylinder 1S.

Next, the ECU 130 returns to step S603 and determines the changed fuel injection mode, or the changed fuel injection amount ratio. In the subsequent step S604, the ECU 130 estimates the temperature of the catalyst 9 using a map that corresponds to the changed injection amount ratio. If a state continues where the catalyst 9 is determined to be not overheated at step S605 and the catalyst temperature Tc is higher than or equal to the predetermined temperature at step S606, the process of steps S603 to S607 is repeated. Accordingly, the ratio of the fuel injection amount of the port injection valve 2 to that of the in-cylinder injection valve 3 is gradually increased. Also, every time the injection amount ratio is changed, the catalyst temperature Tc is estimated.

For example, assume that the current injection amount ratio (in-cylinder injection: port injection) is 9:1. In this case, if the outcome of step S605 is negative and the outcome of step S606 is positive, the injection amount ratio (in-cylinder injection: port injection) is changed, for example, to 5:5 at step S607. Even while the fuel injection is performed according to the changed injection amount ratio, if the outcome of step S605 is negative and the outcome of step S606 is positive, the injection amount ratio (in-cylinder injection:port injection) is changed to 3:7 at step S607.

On the other hand, if the estimated catalyst temperature Tc is lower than the predetermined temperature at step S606, the current process is temporarily suspended. Also, if the catalyst 9 is determined to be in an overtemperature condition at step S605, the ECU 130 increases the fuel injection amount to prevent the catalyst 9 from being overheated and returns to step S603. As described in the first embodiment, the increase of the fuel injection amount may be achieved by making the increase rate of the fuel injection of the port injection valve 2 more than or equal to that of the in-cylinder injection valve 3. Alternatively, the increase of the fuel injection amount may be entirely achieved by increase of the fuel injection amount of the port injection valve 2.

In this manner, when the catalyst 9 is not in an overtemperature condition, the ratio of the port injection amount to the in-cylinder injection amount is gradually increased. Then, when the catalyst 9 enters an overtemperature condition, the fuel injection amount is increased. In a case where increase of the fuel injection amount is repeatedly performed, the amount of fuel increase in each increasing is preferably decreased compared to the previous fuel increase amount.

Next, estimation of the catalyst temperature Tc performed at step S604 will be described. The ECU 130 computes the engine rotational speed NE based on an output signal from a crank sensor 44. The ECU 130 divides the intake air flow rate GA detected by an airflow sensor 43 by the engine operational speed NE to obtain the engine load KL (g/rev) (GN=GA/NE). The ECU 130 then estimates the catalyst temperature Tc based on the engine rotational speed NE, the engine load KL, and the steady temperature map that corresponds to the injection amount ratio determined at step S603 of FIG. 14. In the present embodiment, the catalyst temperature Tc is obtained through a weighted average process, or "gradual-change" process. Specifically, the catalyst temperature Tc [° C.] is obtained using the following equations.

Catalyst Temperature $Tc$[° C.]=(1−[Time Constant])×[Previous Value]+[Time Constant]×[Steady Temperature]−[Previous Value])

Catalyst Temperature $Tc$[° C.]=[Previous Value]+[Time Constant]×[Steady Temperature]

The previous value refers to the catalyst temperature Tc obtained in the previous cycle.

If the engine 1 continues operating in a predetermined constant operational state (the engine rotational speed NE, the engine load KL, the fuel injection mode (the ratio between the in-cylinder injection amount and the port injection)), that is, if the stable operation of the engine 1 continues, the catalyst temperature Tc seeks a certain temperature. The convergence value of the catalyst temperature Tc during the stable operation of the engine 1 is the steady temperature in the above equation.

The time constant is a numerical value representing the rate of change of the catalyst temperature Tc and takes on a value from zero to one. The time constant takes on a value close to one in an engine operational state where the catalyst temperature Tc is changed quickly. The time constant takes on a value close to zero in an engine operational state where the catalyst temperature Tc is changed slowly. The time constant is computed based on the engine operational state, such as the engine load KL, the engine rotational speed NE, and the fuel injection amount ratio by referring to a predetermined time constant map.

FIGS. 15(*a*) and 15(*b*) show examples of maps that are referred to for obtaining the steady temperature. The constant temperature map of FIG. 15(*a*) is used in a case where the injection amount ratio (in-cylinder injection:port injection) is 10:0. The constant temperature map of FIG. 15(*b*) is used in a case where the injection amount ratio (in-cylinder injection:port injection) is 0:10. Other than these maps, a number of steady temperature maps corresponding to injection amount ratios are prepared. The time constant map and the steady temperature maps are obtained, for example, through experiments, and are stored in the ROM 137 of the ECU 130. When computing the catalyst temperature Tc, the ECU 130 retrieves the steady temperature map and the time constant map from the ROM 137. The steady temperature and the time constant may be computed according to predetermined functions expressions instead of the maps. The catalyst temperature Tc may be computed based on a value measured by the exhaust temperature sensor 46. Alternatively, the catalyst temperature Tc may be obtained from the temperature sensor 40, which directly detects the catalyst temperature as in the first embodiment.

In general, the amount of heat generated by combustion per unit time is increased as the engine load and the rotational speed of the engine 1 are increased. Accordingly, the catalyst temperature Tc is increased. As shown in FIGS. 15(*a*) and 15(*b*), under a condition where the engine rotational speed NE and the engine load KL are constant, the steady temperature is higher when the ratio of the in-cylinder injection amount is 100% than when the ratio of the in-cylinder injection amount is 0%. In other words, the catalyst temperature Tc is lower when the port injection is performed than when the in-cylinder injection is performed. Therefore, when the catalyst temperature Tc needs to be prevented from increasing, it is effective to increase the ratio of the port injection amount.

In the present invention described above, when the catalyst temperature Tc is higher than or equal to a predetermined temperature and the catalyst 9 is not in an overtemperature condition, the ratio of the port injection amount to the in-cylinder injection amount is increased. Therefore, as in the first embodiment, the catalyst temperature Tc is favorably lowered while reducing toxic substances such as CO, HC, and NOx contained exhaust gas and black smoke. Also, since the catalyst temperature Tc is prevented from increasing by increasing the port injection amount ratio, the fuel injection amount itself does not need to be increased. This prevents the fuel economy from deteriorating.

Further, when the engine 1 is operating under high load, the in-cylinder injection, which excels in generating power of the engine 1, is actively performed. When the temperature of the catalyst 9 needs to be prevented from increasing, the port injection amount ratio is gradually increased. Accordingly, the catalyst temperature Tc is prevented from increasing while permitting the engine 1 to maximize the power generation performance.

When the catalyst 9 is in an overtemperature condition, the fuel injection amount is increased so that the catalyst temperature Tc is reliably prevented from overheating.

A fifth embodiment of the present invention will now be described with reference to FIGS. 16 and 17. The differences from the fourth embodiment of FIGS. 13 to 15(*b*) will mainly be discussed.

Figure 16:
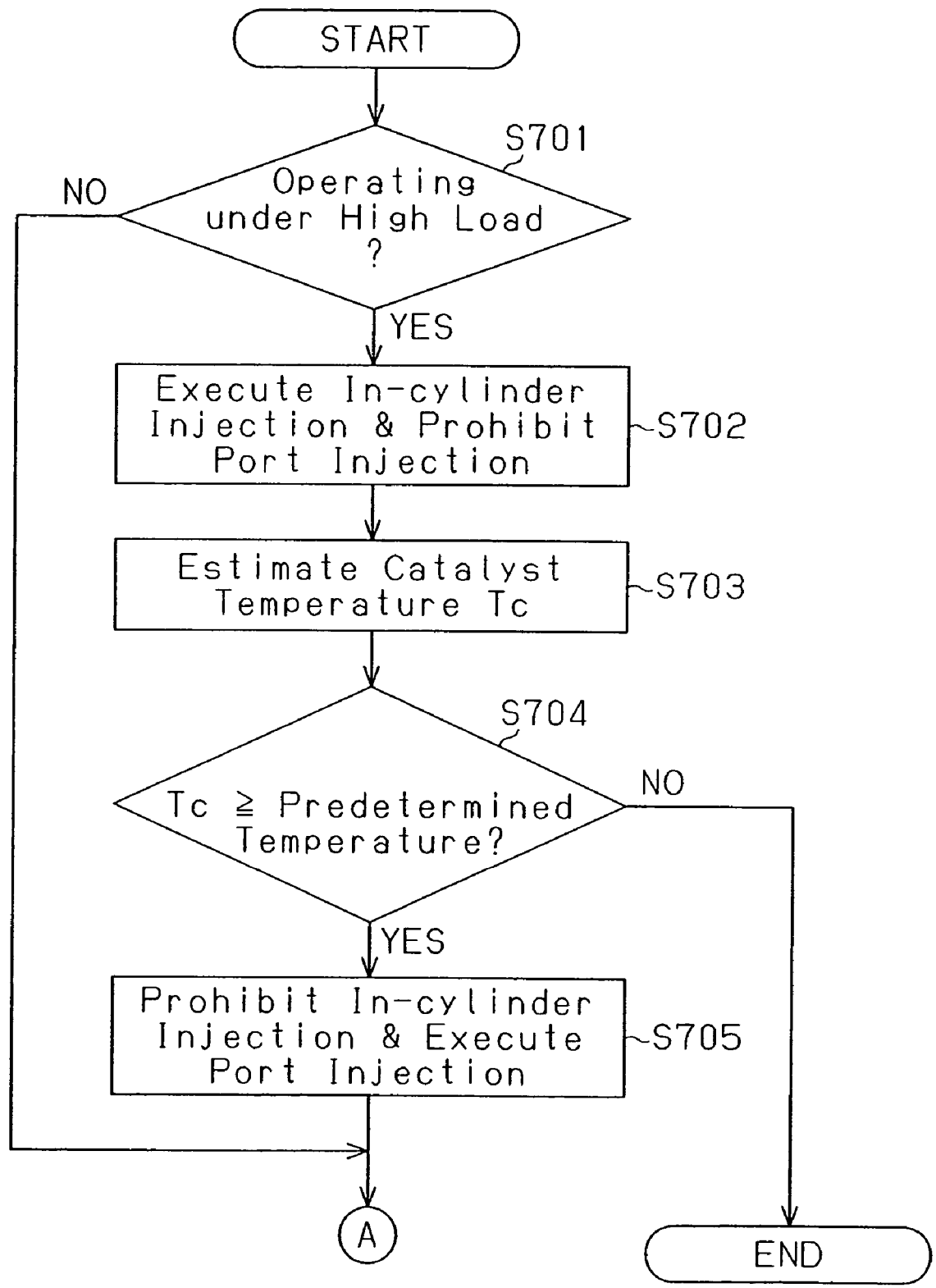
FIG. 16 is a flowchart showing a procedure for controlling fuel injection according to a fifth embodiment.
Figure 17:
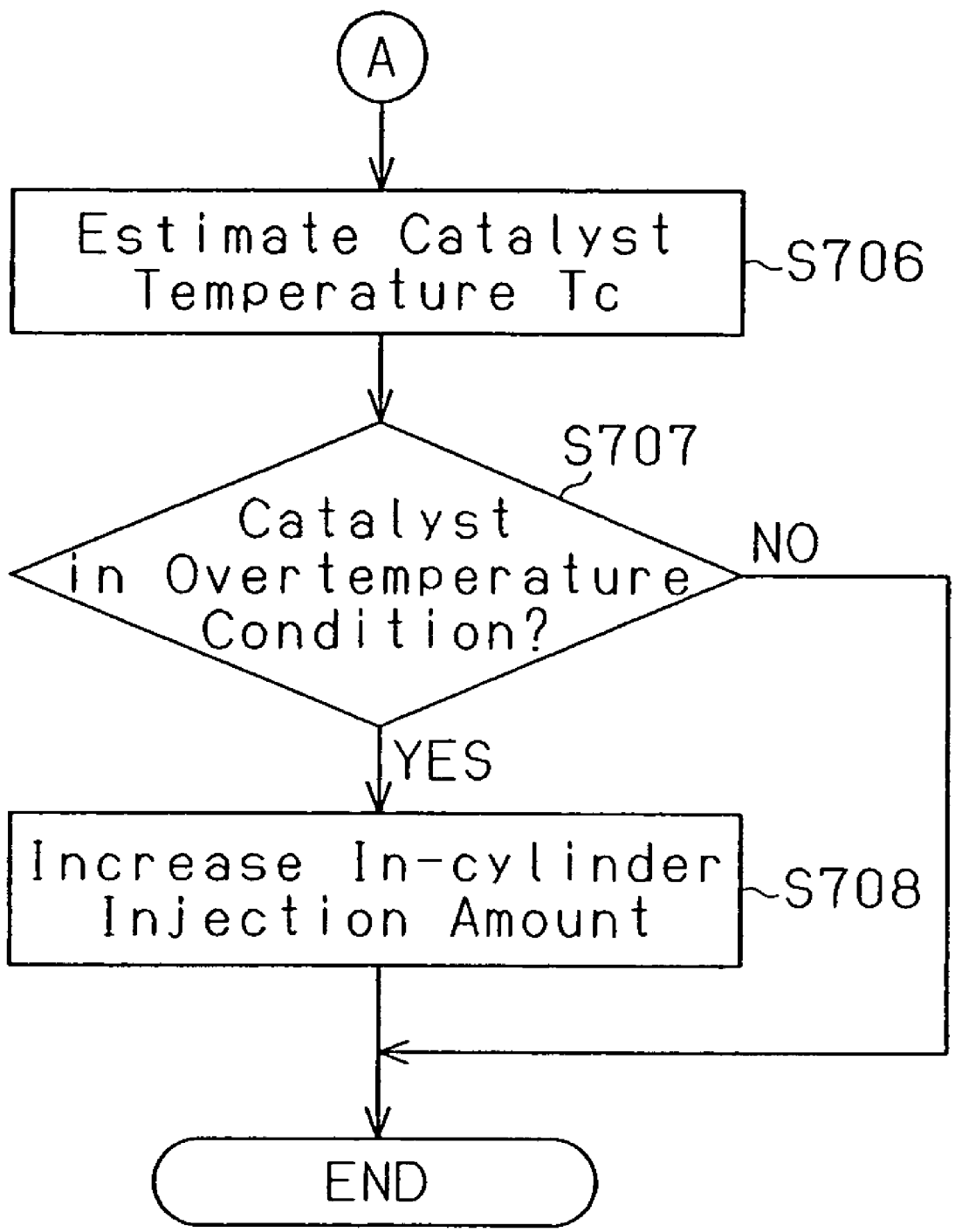
FIG. 17 is a flowchart showing a procedure subsequent to the procedure shown in FIG. 16.

FIGS. 16 and 17 are flowcharts showing a procedure of fuel injection control according to this embodiment. As shown in FIG. 16, first at step S701, the ECU 130 determines whether an engine 1 is operating under high load. If the engine 1 is operating under high load, the ECU 130 sets a fuel injection mode for causing the in-cylinder injection valve 3 to inject fuel and prohibiting the port injection valve 2 from injecting fuel. Then, the ECU 130 proceeds to step S703. If the engine 1 is not operating under high load, the ECU 130 sets an injection mode that is different from the injection mode set at step S702. For example, the ECU 130 sets a mode where only the port injection valve 2 injects fuel. Subsequently, the ECU 130 proceeds to step S706 of FIG. 17.

At step S703, the ECU 130 retrieves a steady temperature map and a time constant map that correspond to the fuel injection amount ratio (in-cylinder injection:port injection) of 10:0, and estimates the catalyst temperature Tc. The estimation of the catalyst temperature Tc is performed in the same manner as the fourth embodiment, and the map of FIG. 15(*a*) is used as the steady temperature map. At step S704, the ECU 130 determines whether the estimated catalyst temperature Tc is higher than or equal to a predetermined temperature. As described in the fourth embodiment, the predetermined temperature is lower than a temperature (reference value) for determining that the catalyst 9 is in an overtemperature condition. If the catalyst temperature Tc is lower than the predetermined temperature, the current process is temporarily suspended.

On the other hand, if the catalyst temperature Tc is higher than or equal to the predetermined temperature, the ECU 130 proceeds to step S705 and changes the fuel combustion mode. Specifically, the ECU 130 sets a fuel injection mode in which the in-cylinder injection valve 3 is prohibited from injecting fuel and the port injection valve 2 injects fuel. Therefore, the fuel injection amount ratio (in-cylinder injection:port injection) is 0:10.

Then, at step S706, the ECU 130 retrieves a steady temperature map and a time constant map that correspond to the fuel injection amount ratio (in-cylinder injection:port injection) of 0:10, and estimates the catalyst temperature Tc. The map of FIG. 15(*b*) is used as the steady temperature map. At step S707, the ECU 130 determines whether the catalyst 9 is in an overtemperature condition. If the catalyst 9 is not in an overtemperature condition, the ECU 130 temporarily suspends current process. When determining that the catalyst 9 is in an overtemperature condition, the ECU 130 proceeds to step S708. At step S708, the ECU 130 increases the fuel injection amount of the in-cylinder injection valve 3, and temporarily suspends the current process.

In this embodiment, when the catalyst 9 is determined to be in an overtemperature condition, fuel is increased through the in-cylinder injection (step S708). That is, in a state immediately before fuel is increased through the in-cylinder injection, fuel to be combusted is supplied only by the port injection. If the fuel injection amount is increased in this state, the increased amount is hardly combusted. Therefore, fuel increase through the in-cylinder injection does not slow down combustion while air is cooled by heat of evaporation of fuel directly injected into the cylinder 1S. Therefore, fuel increase through the in-cylinder injection effectively lowers the exhaust gas temperature and the catalyst temperature Tc.

In this manner, depending on the fuel injection mode prior to increase of the fuel amount, it is effective to increase the amount of fuel by using only the in-cylinder injection valve 3. That is, a mode for controlling the injection valves 2, 3 when increasing the amount of fuel may be set according to the engine operational state (including the engine rotational speed NE, the engine load KL, the fuel injection mode, the fuel injection ratio between the injection valves 2, 3) as necessary.

In the illustrated embodiments, the intake passage injection valve is not limited to the port injection valve 2, which injects fuel toward the intake port 4a. The intake passage injection valve may be an injection valve that is located in the surge tank 47 (see FIG. 13). For example, the intake passage injection valve may be a cold start injector, which is actuated when the engine 1 is started cold.

Instead of detecting the intake air flow rate GA with the airflow sensor 43, the intake air flow rate may be computed based on an intake air pressure detected by a pressure sensor provided in the intake passage 4. The engine load KL can be computed using the depression degree of the acceleration pedal as a parameter.

In the illustrated embodiments, prevention of overheating of the catalyst 9 is described. However, the present invention may be applied to prevention of overheating of other components provided in an exhaust system (exhaust passage 7). That is, the present invention may be applied to exhaust system components, such as the A/F sensor 41 and the exhaust temperature sensor 46.

The invention claimed is:

1. A fuel injection control apparatus for an internal combustion engine, wherein the engine has an in-cylinder injection valve for injecting fuel into a cylinder of the engine, an intake passage injection valve for injecting fuel into an intake passage connected to the cylinder, and an exhaust passage connected to the cylinder, the apparatus comprising:

a temperature determining section that determines whether a component located in the exhaust passage is in an overtemperature condition; and an injection control section that controls the in-cylinder injection valve and the intake passage injection valve, wherein, when the component is determined to be in the overtemperature state, the injection control section controls the injection valves to increase the amount of fuel supplied to the cylinder compared to a case where the component is determined not to be in the overtemperature state, thereby preventing the component from being overheated, and wherein the injection control section sets a mode for causing the injection valves to increase the amount of supplied fuel according to an operational state of the engine.

2. The apparatus according to claim 1, wherein the injection control section selects the injection valve to perform increase of the supplied fuel according to the engine operational state.

3. The apparatus according to claim 2, wherein, in a case where the component is determined to be in the overtemperature condition when the engine is operating in a fuel injection mode in which fuel is injected at least from the in-cylinder injection valve, the injection control section increases the amount of fuel supplied to the cylinder such that the ratio of a fuel injection amount of the intake passage injection valve to a fuel injection amount of the in-cylinder injection valve is increased.

4. The apparatus according to claim 2, wherein, in a case where the component is determined to be in the overtemperature condition when the engine is operating in a fuel injection mode in which fuel is injected at least from the in-cylinder injection valve, the injection control section causes at least the intake passage injection valve to inject fuel for increasing the supplied fuel.

5. The apparatus according to claim 2, wherein, in a case where the component is determined to be in the overtemperature condition when the engine is operating in a fuel injection mode in which fuel is injected only from the intake passage injection valve, the injection control section causes the in-cylinder injection valve for increasing the supplied fuel.

6. The apparatus according to claim 1, wherein the injection control section is capable of repeatedly increasing fuel supplied to the cylinder by a predetermined increase amount at a time, and wherein the injection control section gradually decreases the increase amount every time the injection control section increases the supplied fuel.

7. The apparatus according to claim 1, wherein the temperature determining section determines whether the temperature of the component is higher than or equal to a predetermined reference value based on a parameter related to the temperature of the component, and wherein, when the temperature of the component is higher than or equal to the reference value, the injection control section controls the injection valves to increase the amount of fuel supplied to the cylinder.

8. The apparatus according to claim 7, wherein the temperature determining section determines the temperature of the component based on the engine operational state and a fuel injection amount ratio between the in-cylinder injection valve and the intake passage injection valve.

9. The apparatus according to claim 1, wherein the component includes a catalyst that purifies exhaust gas passing through the exhaust passage.

10. The apparatus according to claim 9, further comprising a temperature sensor that detects the temperature of the catalyst.

11. The apparatus according to claim 9, wherein the cylinder is one of a plurality of cylinders, and the catalyst is one of a plurality of catalysts, wherein each catalyst corresponds to at least one of the cylinders, and wherein the temperature determining section determines whether each of the catalysts is in the overtemperature condition, and wherein the injection control section increases the amount of fuel supplied to the cylinder that corresponds to the catalyst that is determined to be in the overtemperature condition.

12. A fuel injection control apparatus for an internal combustion engine, wherein the engine has an in-cylinder injection valve for injecting fuel into a cylinder of the engine, an intake passage injection valve for injecting fuel into an intake passage connected to the cylinder, and an exhaust passage connected to the cylinder, the apparatus comprising:

a temperature determining section that determines whether the temperature of a component located in the exhaust passage is higher than or equal to a predetermined reference value based on a parameter related to the temperature of the component; and an injection control section, wherein, when the temperature of the component is higher than or equal to the reference value, the injection control section increases a fuel injection amount of the intake passage injection valve compared to a case where the temperature of the component is not higher than or equal to the reference value, thereby preventing the component from being overheated.

13. The apparatus according to claim 12, wherein the injection control section causes at least the intake passage injection valve to increase a fuel injection amount such that the total amount fuel supplied to the cylinder is increased.

14. The apparatus according to claim 12, wherein, when the temperature of the component becomes higher than or equal to the reference value, the injection control section increases a fuel injection amount of the in-cylinder injection valve in addition to the fuel injection amount of the intake passage injection valve.

15. The apparatus according to claim 14, wherein the injection control section causes an increase rate of the fuel injection amount of the intake passage injection valve to be equal to or more than that of the in-cylinder injection valve.

16. The apparatus according to claim 12, wherein, in a case where the temperature of the component becomes higher than or equal to the reference value when the engine is operating in a fuel injection mode in which fuel is injected at least from the in-cylinder injection valve, the injection control section increases the fuel injection amount of the intake passage injection valve and causes the in-cylinder injection valve to stop injecting fuel.

17. The apparatus according to claim 12, wherein the temperature determining section determines the temperature of the component based on the engine operational state and a fuel injection amount ratio between the in-cylinder injection valve and the intake passage injection valve.

18. The apparatus according to claim 12, wherein the component includes a catalyst that purifies exhaust gas passing through the exhaust passage.

19. The apparatus according to claim 18, further comprising a temperature sensor that detects the temperature of the catalyst.

20. The apparatus according to claim 18, wherein the cylinder is one of a plurality of cylinders, and the catalyst is one of a plurality of catalysts, wherein each catalyst corresponds to at least one of the cylinders, and wherein the temperature determining section determines whether each of the catalysts is in the overtemperature condition, and wherein the injection control section increases the amount of fuel supplied to the cylinder that corresponds to the catalyst that is determined to be in the overtemperature condition.

21. A fuel injection control method for an internal combustion engine, wherein the engine has an in-cylinder injection valve for injecting fuel into a cylinder of the engine, an intake passage injection valve for injecting fuel into an intake passage connected to the cylinder, and an exhaust passage connected to the cylinder, the method comprising:

determining whether a component located in the exhaust passage is in an overtemperature condition;

controlling, when the component is determined to be in the overtemperature state, the in-cylinder injection valve and the intake passage injection valve to increase the amount of fuel supplied to the cylinder compared to a case where the component is determined not to be in the overtemperature state, thereby preventing the component from being overheated; and setting a mode for causing the injection valves to increase the amount of supplied fuel according to an operational state of the engine.

22. A fuel injection control method for an internal combustion engine, wherein the engine has an in-cylinder injection valve for injecting fuel into a cylinder of the engine, an intake passage injection valve for injecting fuel into an intake passage connected to the cylinder, and an exhaust passage connected to the cylinder, the method comprising:

determining whether the temperature of a component located in the exhaust passage is higher than or equal to a predetermined reference value based on a parameter related to the temperature of the component; and increasing, when the temperature of the component is higher than or equal to the reference value, a fuel injection amount of the intake passage injection valve compared to a case where the temperature of the component is not higher than or equal to the reference value, thereby preventing the component from being overheated.

* * * * *

UNITED STATES PATENT AND TRADEMARK OFFICE
CERTIFICATE OF CORRECTION

PATENT NO. : 7,249,454 B2  Page 1 of 1
APPLICATION NO. : 10/985986
DATED : July 31, 2007
INVENTOR(S) : Masaharu Ichise et al.

It is certified that error appears in the above-identified patent and that said Letters Patent is hereby corrected as shown below:

| Column | Line | |
|---|---|---|
| 7 | 45 | Change "Tic" to --Tlc--. |
| 9 | 59 | Change "amount a" to --amount α--. |
| 13 | 41 | Change "amount 6" to --amount δ--. |
| 19 | 59 | Change "[Previous Value]+[Time Constant]x Steady" to --[Previous Value]+[Time Constant]x ([Steady--. |
| 19 | 60 | After "Temperature]-[Previous Value])" start new line and insert --or--. |

Signed and Sealed this

Thirteenth Day of May, 2008

JON W. DUDAS
*Director of the United States Patent and Trademark Office*